US012657797B2

(12) United States Patent
Shi et al.

(10) Patent No.: US 12,657,797 B2
(45) Date of Patent: Jun. 16, 2026

---

(54) SYSTEM AND METHOD FOR 3D IMAGING RECONSTRUCTION USING DUAL-DOMAIN NEURAL NETWORK

(71) Applicant: NEURALTRAK, INC, Los Altos, CA (US)

(72) Inventors: Linxi Shi, Oakland, CA (US); George Zdasiuk, Portola Valley, CA (US); Shiyu Xu, San Ramon, CA (US)

(73) Assignee: Neuraltrak, Inc, Los Altos, CA (US)

( * ) Notice: Subject to any disclaimer, the term of this patent is extended or adjusted under 35 U.S.C. 154(b) by 257 days.

(21) Appl. No.: 18/400,957

(22) Filed: Dec. 29, 2023

(65) Prior Publication Data

US 2024/0221247 A1 Jul. 4, 2024

Related U.S. Application Data

(60) Provisional application No. 63/435,991, filed on Dec. 29, 2022.

(51) Int. Cl.
*G06K 9/00* (2022.01)
*G06T 7/50* (2017.01)
(Continued)

(52) U.S. Cl.
CPC .............. *G06T 11/005* (2013.01); *G06T 7/50* (2017.01); *G06T 11/006* (2013.01); *G06T 15/00* (2013.01);
(Continued)

(58) Field of Classification Search
CPC ....... G06T 11/005; G06T 7/50; G06T 11/006; G06T 15/00; G06T 2207/10081;
(Continued)

(56) References Cited

U.S. PATENT DOCUMENTS 5,951,475 A 9/1999 Gueziec et al.
5,963,613 A 10/1999 Navab
(Continued)

FOREIGN PATENT DOCUMENTS

AU 2022201732 A1 4/2022
CN 104783824 A 7/2015
(Continued)

OTHER PUBLICATIONS

Na Guo et al., "New Calibrator with Points Distributed Conical Helically for Online Calibration of C-Arm", Sensors, 2019, vol. 19, 1989, pp. 1-17.
(Continued)

*Primary Examiner* — Shervin K Nakhjavan
(74) *Attorney, Agent, or Firm* — Sheppard Mullin Richter & Hampton LLP

(57) ABSTRACT

This application describes a method and system for medical 3D imaging reconstruction based on limited-angle 2D image acquisition, which only requires 30~50% of the data required by traditional scanner-based 3D reconstruction. This approach significantly reduces the radiation dose requirement and improves clinical efficiency. An example method includes: capturing a plurality of 2-dimensional (2D) projections of a target that cover a limited angle of the target; calibrating the plurality of 2D projections of the target to obtain a plurality of calibrated 2D projections; generating a sinogram based on the plurality of calibrated 2D projections; inputting the sinogram into a dual-domain neural network to obtain a 3D volumetric image of the target that is geometrically corrected and calibrated.

20 Claims, 22 Drawing Sheets

---

1600

Capture a plurality of 2-dimensional (2D) projections of a target that cover a limited angle of the target
1610

Perform geometric calibration and physical correction on the plurality of 2D projections of the target to obtain a plurality of physically corrected and geometrically calibrated 2D projections
1620

Generate a sinogram with a limited angle coverage of the target based on the plurality of physically corrected and geometrically calibrated 2D projections
1630

Update the sinogram by at least inserting estimated data to a missing angle region of the sinogram
1640

Input the updated sinogram into a dual-domain neural network, wherein the dual-domain neural network comprises: a first neural network trained to optimize a sinogram constructed based on the limited angle fluoroscopic images, and a second neural network trained to optimize a 3D reconstruction that is generated based on the sinogram optimized by the first neural network
1650

Obtain a 3D volumetric image of the target as an output of the dual-domain neural network
1660

(51) Int. Cl.

| | |
|---|---|
| *G06T 11/00* | (2006.01) |
| *G06T 15/00* | (2011.01) |
| *G06V 10/24* | (2022.01) |
| *G06V 10/82* | (2022.01) |

(52) U.S. Cl.

CPC .............. *G06V 10/24* (2022.01); *G06V 10/82* (2022.01); *G06T 2207/10081* (2013.01)

(58) Field of Classification Search

CPC ........ G06T 2211/424; G06T 2211/441; G06V 10/24; G06V 10/82

See application file for complete search history.

(56) References Cited

U.S. PATENT DOCUMENTS

| | | | | |
|---|---|---|---|---|
| 8,270,760 | B2 * | 9/2012 | Miao ..................... | G06T 11/006 |
| | | | | 382/280 |
| 8,705,828 | B2 * | 4/2014 | Yang ..................... | G06T 11/005 |
| | | | | 382/285 |
| 9,165,362 | B2 | 10/2015 | Siewerdsen et al. | |
| 9,278,203 | B2 | 3/2016 | Averbuch | |
| 9,595,131 | B2 | 3/2017 | Averbuch | |
| 10,022,098 | B2 * | 7/2018 | Kleinszig ............. | A61B 6/5205 |
| 10,321,898 | B2 | 6/2019 | Weingarten et al. | |
| 10,937,206 | B2 * | 3/2021 | Lu .............................. | G06T 7/11 |
| 10,939,887 | B2 * | 3/2021 | Sandholm ................. | G06T 7/11 |
| 11,039,805 | B2 * | 6/2021 | De Man ................... | G06N 3/09 |
| 11,071,509 | B2 | 7/2021 | Averbuch | |
| 11,089,974 | B2 | 8/2021 | Averbuch | |
| 11,335,041 | B2 * | 5/2022 | Yang ..................... | A61B 6/025 |
| 11,403,791 | B2 * | 8/2022 | Lee ..................... | A61B 6/5205 |
| 11,406,345 | B2 | 8/2022 | Ni et al. | |
| 11,510,642 | B2 * | 11/2022 | Butler ..................... | G06T 15/08 |
| 11,806,175 | B2 * | 11/2023 | Xie ..................... | A61B 6/5205 |
| 11,816,768 | B1 | 11/2023 | Averbuch et al. | |
| 2010/0284601 | A1 | 11/2010 | Rubner et al. | |
| 2017/0238897 | A1 | 8/2017 | Siewerdsen et al. | |
| 2024/0148445 | A1 * | 5/2024 | Hartley .................. | A61B 6/487 |
| 2025/0045982 | A1 * | 2/2025 | Stayman .............. | G06N 3/0455 |

FOREIGN PATENT DOCUMENTS

| | | |
|---|---|---|
| CN | 110047113 B | 5/2021 |
| EP | 3525171 B1 | 12/2020 |
| EP | 3209213 B1 | 5/2023 |

OTHER PUBLICATIONS

Sahar Hosseinian et al., "Toward an End-to-End Calibration for Mobile C-Arm in Combination with a Depth Sensor for Surgical Augmented Reality Applications", Sensors, 2020, 20(36), pp. 1-16.

Michael A. Pritchett, "Prospective Analysis of a Novel Endobronchial Augmented Fluoroscopic Navigation System for Diagnosis of Peripheral Pulmonary Lesions", J. Bronchol Intervent Pulmonol, vol. 28, No. 2, Apr. 2021, pp. 107-115.

Randolph Setser et al., "Cone beam CT imaging for bronchoscopy: a technical review", Journal of Thoracic Disease, 2020; 12(12), pp. 7416-7428.

Linxi Shi et al., "Fast shading correction for cone-beam CT via partitioned tissue classification", Phys Med Biol., 64(6), Author Manuscript; available in PMC Jun. 1, 20196, pp. 1-21.

Linxi Shi et al., "Library based x-ray scatter correction for dedicated cone beam breast CT", Med. Phys. 43(8), Aug. 2016, pp. 4529-4544.

Linxi Shi et al., "Single-Shot Quantitative X-ray Imaging Using a Primary Modulator and Dual-Layer Detector: Simulation and Phantom Studies", Proc SPIE Int Soc Opt Eng. 2022, Author Manuscript; available in PMC Dec. 21, 2022, pp. 1-9.

Linxi Shi et al., "X-ray scatter correction for dedicated cone beam breast CT using a forward-projection model", Med. Phys. 44(6), Jun. 2017, pp. 2312-2320.

Linxi Shi et al., "Fast shading correction for cone beam CT in radiation therapy via sparse sampling on planning CT", Med. Phys. 44(5), May 2017, pp. 1796-1808.

Changyu Chen et al., "Sam's Net: A Self-Augmented Multistage Deep-Learning Network for End-to-End Reconstruction of Limited Angle CT", IEEE Transactions on Medical Imaging, vol. 41, No. 10, Oct. 2022, pp. 2912-2924.

J. Webster Stayman et al., "PIRPLE: A Penalized-Likelihood Framework for Incorporation of Prior Images in CT Reconstruction", Phys Med Biol., 58(21), Nov. 7, 2013, Author Manuscript; available in PMC Nov. 7, 2014, pp. 1-29.

A. Uneri et al., "Known-component 3D-2D registration for quality assurance of spine surgery pedicle screw placement", Phys Med Biol. Oct. 21, 2015, 60(20), Author Manuscript; available in PMC Oct. 21, 2016, pp. 8007-8024.

\* cited by examiner

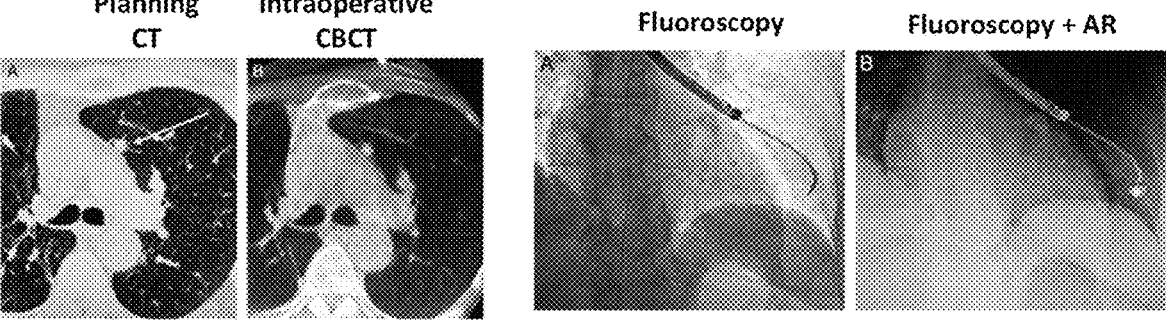
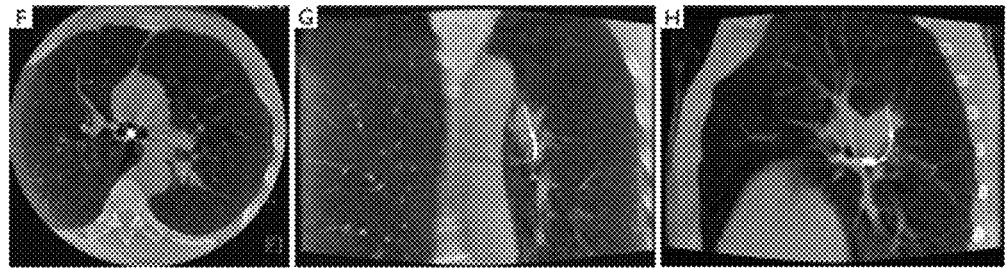
Sources: Pritchett et al, J Bronchology & Interv. Pulmonoly.2018 25(4) and Setser et al, J horac Dis. 2020 12(12)
FIG. 2

310

Terrible Vibration          Poor Quality
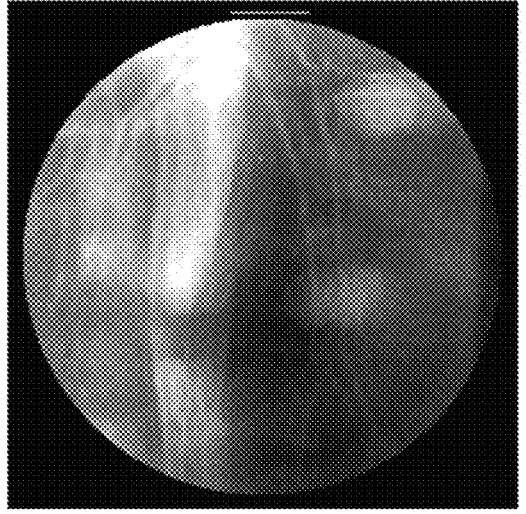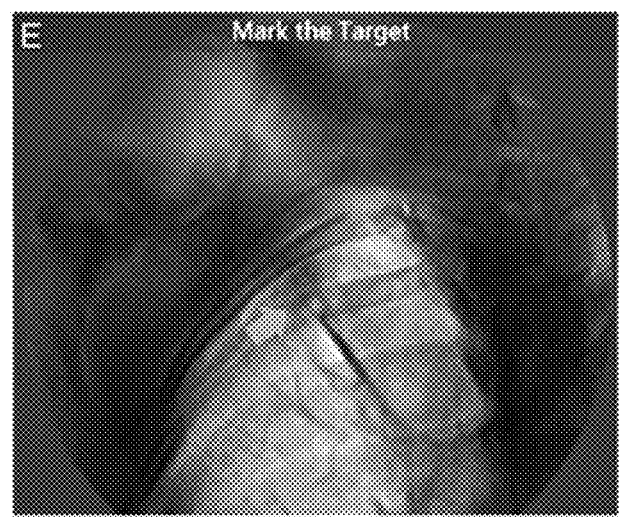
FIG. 3B

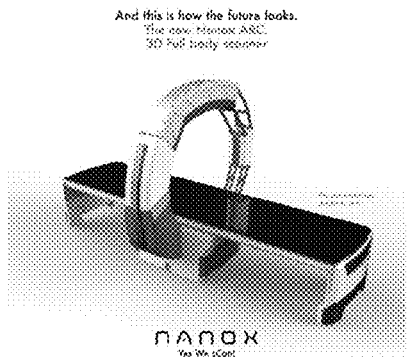
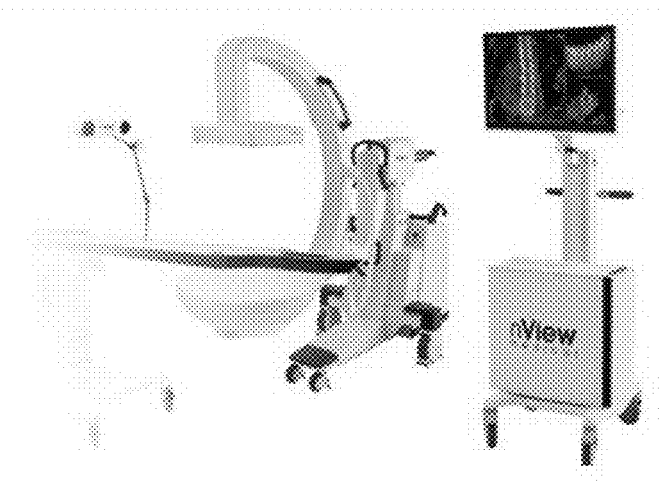
FIG. 3C

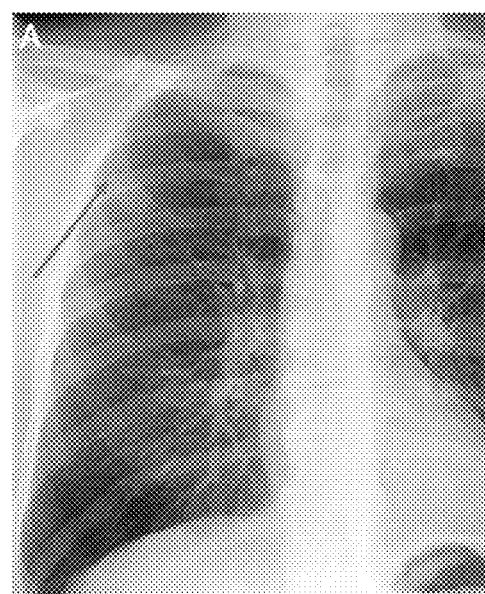
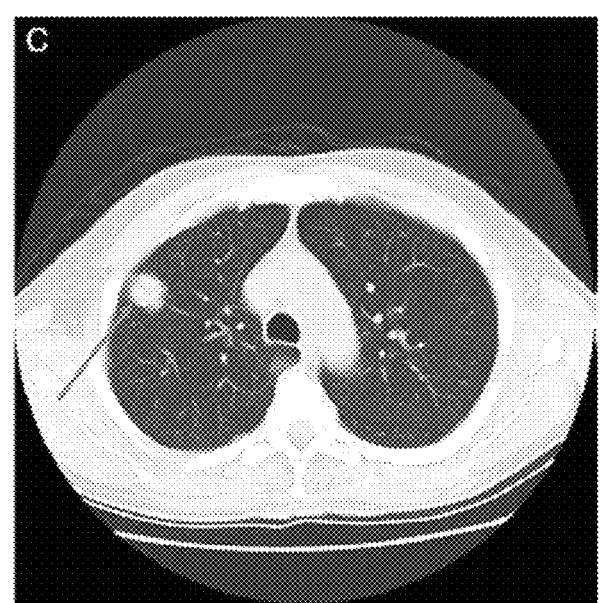
FIG. 4

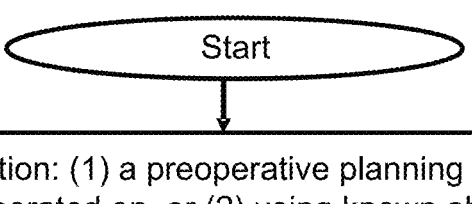

Receive prior information: (1) a preoperative planning CT scan that include the body sites to be operated on, or (2) using known object (phantom) or (3) other geometric information of imaging system obtained remotely (lidar, rangefinder, etc.)

Obtain intra-operative limited angle fluoroscopic images. The system performs auto geometric calibration, and the AI will generate 3D reconstructed images Display to user through a portable tablet which provide full control of the procedure management.

Direct the user to use planning CT for guidance, which is depending on clinical procedures.

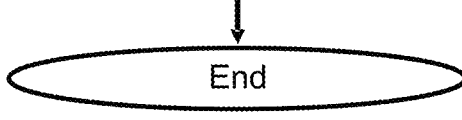

FIG. 5

In-suite post-procedure CBCT: non-rigid body part

In-suite pre/post-op CBCT: rigid body part

Improve surgical tool placement accuracy

Auto self-calibration

Physical Correction

N Calibrated Projections    Physical Non-idealities    Physical Corrected Projections    Prepare data in Sinogram Convert

Physics based correction (a) Setup Geometry for GPU based Monte Carlo Simulation X-ray Source Patient X-ray Detector (b) First Pass Recon (without scatter correction)

(c) Create Material Density Volume (d) Calculate primary & scatter images (e) Scatter corrected images (f) Scatter corrected recon Scatter correction Dual-domain Network for 3D visualization based on limited angle scanning
(training data collection and generation)

Dual-domain Network for 3D visualization based on limited angle scanning
(training process)
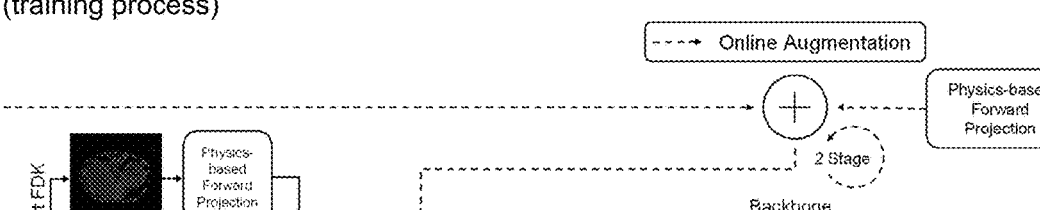
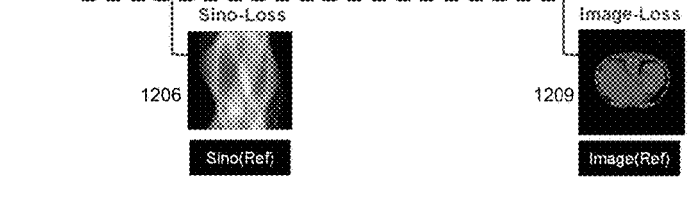
FIG. 12B

Dual-domain Network for 3D visualization based on limited angle scanning (training process)

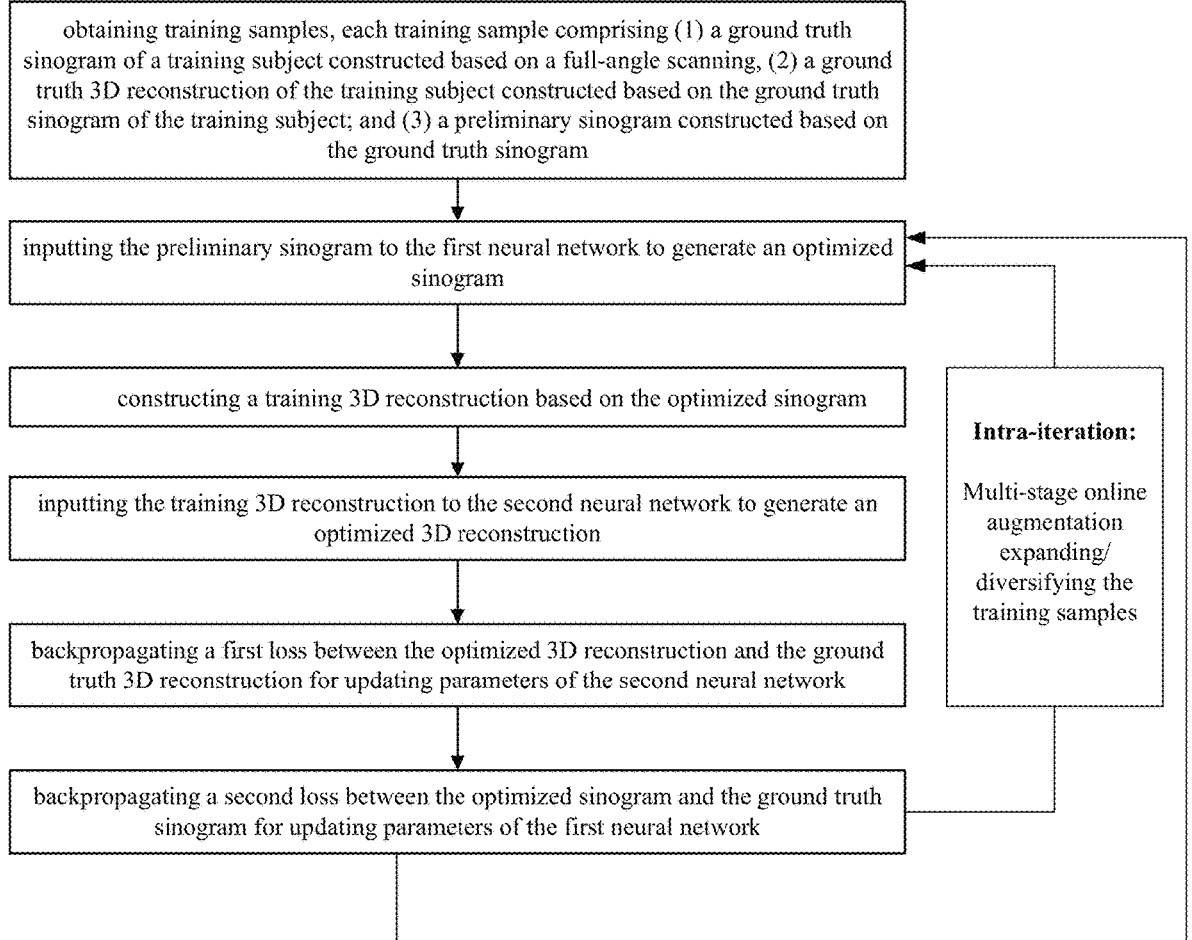

obtaining training samples, each training sample comprising (1) a ground truth sinogram of a training subject constructed based on a full-angle scanning, (2) a ground truth 3D reconstruction of the training subject constructed based on the ground truth sinogram of the training subject; and (3) a preliminary sinogram constructed based on the ground truth sinogram inputting the preliminary sinogram to the first neural network to generate an optimized sinogram constructing a training 3D reconstruction based on the optimized sinogram inputting the training 3D reconstruction to the second neural network to generate an optimized 3D reconstruction backpropagating a first loss between the optimized 3D reconstruction and the ground truth 3D reconstruction for updating parameters of the second neural network backpropagating a second loss between the optimized sinogram and the ground truth sinogram for updating parameters of the first neural network

Intra-iteration:

Multi-stage online augmentation expanding/ diversifying the training samples

After the multi-stage online augmentation, starting another training iteration using a new preliminary sinogram
iteratively performing the jointly training until both the first loss and the second loss are below respective thresholds

FIG. 12C

Dual-domain Network for 3D visualization based on limited angle scanning
(Inferencing process)

Known Component registration (for DBS or spine surgery)

Figure 16:
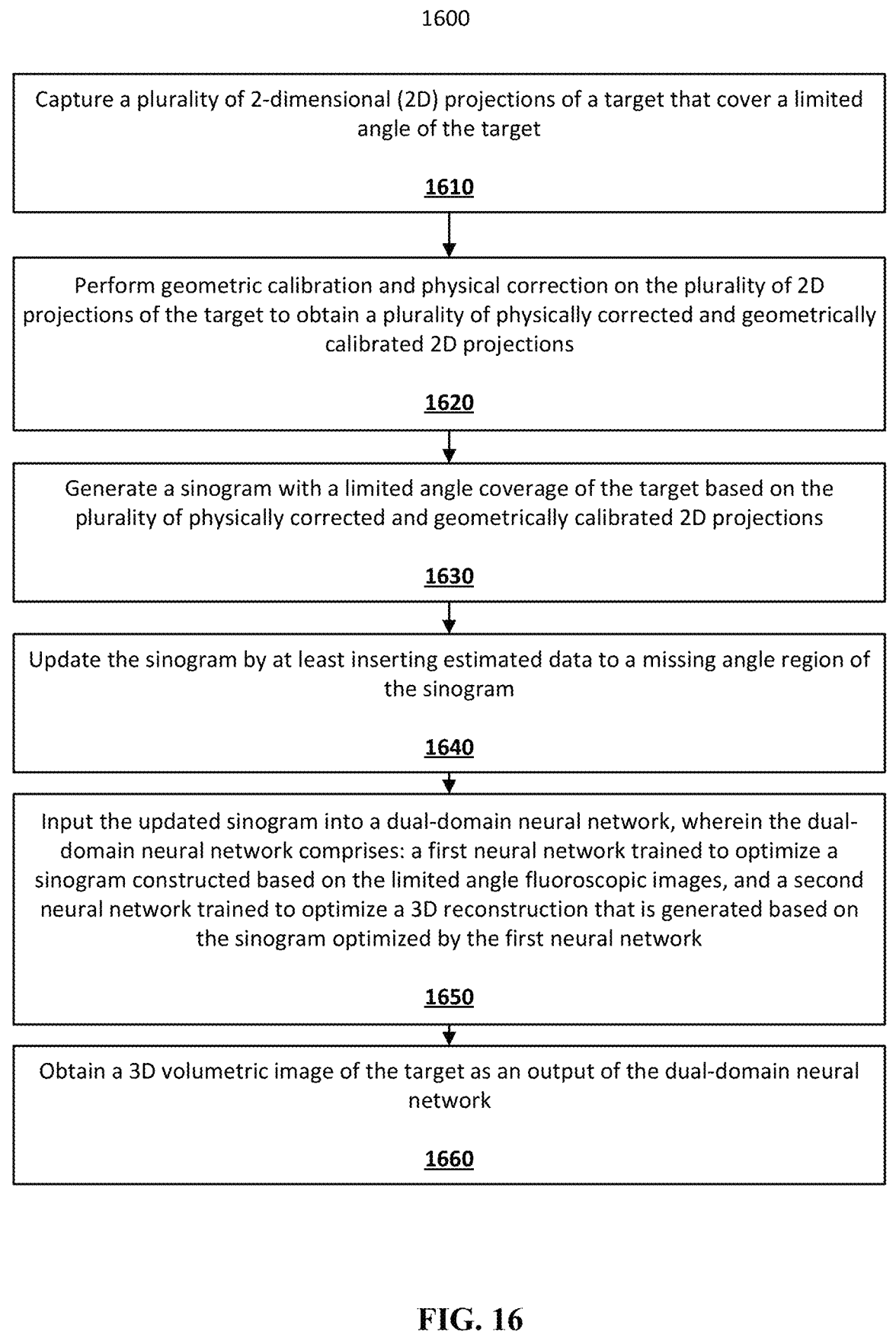

1600

Capture a plurality of 2-dimensional (2D) projections of a target that cover a limited angle of the target

1610

Perform geometric calibration and physical correction on the plurality of 2D projections of the target to obtain a plurality of physically corrected and geometrically calibrated 2D projections

1620

Generate a sinogram with a limited angle coverage of the target based on the plurality of physically corrected and geometrically calibrated 2D projections

1630

Update the sinogram by at least inserting estimated data to a missing angle region of the sinogram

1640

Input the updated sinogram into a dual-domain neural network, wherein the dual-domain neural network comprises: a first neural network trained to optimize a sinogram constructed based on the limited angle fluoroscopic images, and a second neural network trained to optimize a 3D reconstruction that is generated based on the sinogram optimized by the first neural network

1650

Obtain a 3D volumetric image of the target as an output of the dual-domain neural network

SYSTEM AND METHOD FOR 3D IMAGING RECONSTRUCTION USING DUAL-DOMAIN NEURAL NETWORK

CROSS REFERENCE TO RELATED APPLICATION

This application claims the benefit of priority from U.S. Provisional Application No. 63/435,991, filed on Dec. 29, 2022. The content of the U.S. Provisional Application is hereby incorporated by reference in its entirety.

TECHNICAL FIELD

The disclosure relates generally to end-to-end 3D reconstruction of limited angle CT by leveraging prior information and the power of neural networks to fill in the missing imaging data for high-quality three-dimensional imaging reconstruction. The output of the reconstruction may be used for identifying surgical targets and tracking surgical tools in medical procedures involving intrabody navigation.

BACKGROUND

Image-guided minimally invasive procedures enable cost-effective surgeries. A 2-dimensional (2D) portable C-arm x-ray system is commonly used in operating rooms to provide two-dimensional (2D) guidance during such surgical procedures, where the x-ray is attenuated by the patients and received by the imager to form a 2D projection of the imaging site (also referred to 2D images). The 2D guidance through 2D projections generated from the C-arm x-ray system provides reasonable visibility for highly dense tissues, but has difficulties resolving small targets such as lesions or localizing surgical tools in three-dimensional (3D) coordinates. Nowadays, the use of 3D guidance is considered as a necessary tool in many mainstream applications to identify surgical targets and verify the placement of surgical tools, including orthopedics, respiratory, neuro and cardiovascular surgical procedures.

Looking forward, the growing adoption of augmented reality (AR) and robotic surgeries will use 3D images as the backbone to expand use cases. The 3D tomographic volumetric images are usually generated by filtered back-projecting the 2D projections acquired around the imaging object to the 3D coordinates. During this process, a minimum rotation of 180 degrees plus a system fan angle is needed to satisfy the data completeness and render clear 3D visualization.

However, current C-arm x-ray systems encounter significant challenges in delivering high-quality 2D projections that are adequate for 3D reconstruction due to limitations in their rotation angles. Systems capable of achieving sufficient angles, such as 180 degrees plus fan angle, are not only expensive but also scarcely accessible to the general public. While high-end research institutions might afford these advanced systems, their use is typically reserved for complex surgeries like cardiovascular or neurosurgical procedures, leaving community hospitals or ambulatory surgical center (ASC) with less advanced infrastructure unable to perform certain procedures. Additionally, issues like the C-arm's flexing or wobbling during image acquisition compromise image quality. Traditional solutions involve geometric calibration for each image, which requires precise alignment of the X-ray source, the object, and the detector. However, this method is too cumbersome for real-time image reconstruction.

This application describes a method and system that enables accurate 3D visualization based on limited angle acquisition of 2D projections by leveraging a novel dual-domain neural network.

SUMMARY

This specification encompasses a range of embodiments including systems, methods, and non-transitory computer-readable media. These are designed for creating high-quality 3D volumetric images from limited angle 2D projections, utilizing prior information and physics-informed neural networks. The neural networks learn and integrate specific imaging parameters, such as the x-ray source spectrum and the configuration of the x-ray imager/detector, and simulate x-ray interaction with human tissue during both the training and inference stages. This design facilitates real-time self-calibration in the 2D projection acquisition devices.

The described solution may apply to various fields in interventional radiology, such as orthopedic, respiratory, extremity, embolization/ablation, and cardiovascular procedures. For procedures involved known components, such as metal leads in deep brain simulation (DBS, an established treatment for people with movement disorders, such as essential tremor, Parkinson's disease, and dystonia, and psychiatric conditions, such as obsessive-compulsive disorder), or pedicle screw used in spine surgery, the described solution could perform 3D navigation in real-time.

In some aspects, the techniques described herein relate to a computer-implemented method, including: capturing a plurality of 2-dimensional (2D) projections of a target that cover a limited angle of the target; performing geometric calibration and physical correction on the plurality of 2D projections of the target to obtain a plurality of physically corrected and geometrically calibrated 2D projections; and generating a sinogram with a limited angle coverage of the target based on the plurality of physically corrected and geometrically calibrated 2D projections; updating the sinogram by at least inserting estimated data to a missing angle region of the sinogram; inputting the updated sinogram into a dual-domain neural network, wherein the dual-domain neural network includes: a first neural network trained to optimize a sinogram constructed based on limited angle fluoroscopic images, and a second neural network trained to optimize a 3D reconstruction that is generated based on the sinogram optimized by the first neural network; and obtaining a 3D volumetric image of the target as an output of the dual-domain neural network.

In some aspects, the updating the sinogram by at least inserting estimated data to the missing angle region of the sinogram includes: generating a first 3-dimensional (3D) reconstruction of the target based on the sinogram with limited angle coverage; performing a physics-based forward projection on the first 3D reconstruction to obtain the estimated data to the missing angle region; and inserting the estimated data to the missing angle region of the sinogram to obtain the updated sinogram.

In some aspects, the inputting the updated sinogram into the dual-domain neural network includes: feeding the updated sinogram into the first neural network trained to optimize the data inserted to the missing angle region of the sinogram, thereby obtaining an optimized sinogram; generating a second 3D reconstruction based on the optimized sinogram; feeding the second 3D reconstruction into the second neural network trained to further optimizing the second 3D reconstruction by suppressing artifacts in the second 3D reconstruction; and obtaining the 3D volumetric image of the target as an output of the second neural network.

In some aspects, the suppressing artifacts includes adding, removing, or shuffling pixels of the second 3D reconstruction.

In some aspects, the geometric calibration performed on the plurality of 2D projections of the target includes: spatially shifting the plurality of 2D projections based on prior information of the target to achieve a circular trajectory among the plurality of 2D projections, wherein the prior information comprises a shape or a pattern of a physical object used during the capturing of the plurality of 2D projections, a prior computerized tomography (CT) scan of the target, or real-time optical tracking data from one or more optical sensors tracking the device that captures the plurality of 2D projections.

In some aspects, the method further includes jointly training the first neural network and the second neural network, wherein the jointly training includes: obtaining training samples, each training sample including (1) a ground truth sinogram of a training subject constructed based on a full-angle scanning, (2) a ground truth 3D reconstruction of the training subject constructed based on the ground truth sinogram of the training subject; and (3) a preliminary sinogram constructed based on the ground truth sinogram; inputting the preliminary sinogram to the first neural network to generate an optimized sinogram; constructing a training 3D reconstruction based on the optimized sinogram; inputting the training 3D reconstruction to the second neural network to generate an optimized 3D reconstruction; backpropagating a first loss between the optimized 3D reconstruction and the ground truth 3D reconstruction for updating parameters of the second neural network; backpropagating a second loss between the optimized sinogram and the ground truth sinogram for updating parameters of the first neural network; and iteratively performing the jointly training until both the first loss and the second loss are below respective thresholds.

In some aspects, the obtaining the training samples includes: constructing the preliminary sinogram by removing a portion of data from the ground truth sinogram.

In some aspects, the removing the portion of data includes: removing between 50% to 90% of data from the ground truth sinogram.

In some aspects, the jointly training further includes a plurality of self-augmented training stages, each self-augmented training stage including: generating a new training sample during the jointly training using the preliminary sinogram and the optimized 3D reconstruction generated by the second neural network; and feeding the new training sample into the dual-domain neural network for a new round of training.

In some aspects, the generating the new training sample includes: performing forward projection on the optimized 3D reconstruction and filling in missing data to the preliminary sinogram based on output of the forward projection.

In some aspects, the generating the second 3D reconstruction based on the optimized sinogram includes: if prior information of the target is available, performing iterative reconstruction to generate the second 3D reconstruction by using both the prior information of the target and the optimized sinogram, if the prior information of the target is not available, performing Filtered Back Projection (FBP) based on the optimized sinogram to generate the second 3D reconstruction, wherein the prior information of the target includes a shape or a pattern of a physical object used during the capturing of the plurality of 2D projections, or a prior computerized tomography (CT) scan of the target.

In some aspects, the method further includes: displaying the 3D volumetric image of the target on a screen in real-time to provide 3D navigation for surgical procedures involving probing tools.

In some aspects, the method further includes: displaying the 3D volumetric image of the target on a screen in real-time for verifying interventional radiology procedures.

In some aspects, the techniques described herein relate to a non-transitory computer-readable storage medium configured with instructions executable by one or more processors to cause the one or more processors to perform operations including: capturing a plurality of 2-dimensional (2D) projections of a target that cover a limited angle of the target; performing geometric calibration and physical correction on the plurality of 2D projections of the target to obtain a plurality of physically corrected and geometrically calibrated 2D projections; and generating a sinogram with a limited angle coverage of the target based on the plurality of physically corrected and geometrically calibrated 2D projections; updating the sinogram by at least inserting estimated data to a missing angle region of the sinogram; inputting the updated sinogram into a dual-domain neural network, wherein the dual-domain neural network includes: a first neural network trained to optimize a sinogram constructed based on limited angle fluoroscopic images, and a second neural network trained to optimize a 3D reconstruction that is generated based on the sinogram optimized by the first neural network; and obtaining a 3D volumetric image of the target as an output of the dual-domain neural network.

In some aspects, the physical correction includes performing real-time scatter estimation using graphic processing unit (GPU)-based real-time Monte Carlo Simulation.

In some aspects, the method further includes: aligning the 3D volumetric image of the target with images of a navigation system by using a plurality of optical reference points, thereby obtaining aligned 3D images of the target; and displaying the aligned 3D images of the target on a screen in real-time to provide 3D navigation for surgical procedures involving probing tools, or for verifying interventional radiology procedures.

In some aspects, the method further includes: obtaining geometrical parameters of an imaging system capturing the plurality of 2D projections of the target by using one or more optical tracking sensors, and wherein the geometric calibration performed on the plurality of 2D projections of the target comprises: spatially shifting the plurality of 2D projections based on the geometrical parameters of the imaging system to achieve a circular trajectory among the plurality of 2D projections.

In some aspects, the techniques described herein relate to a system, including one or more processors and one or more non-transitory computer-readable memories coupled to the one or more processors and configured with instructions executable by the one or more processors to cause the system to perform operations including: capturing a plurality of 2-dimensional (2D) projections of a target that cover a limited angle of the target; performing geometric calibration and physical correction on the plurality of 2D projections of the target to obtain a plurality of physically corrected and geometrically calibrated 2D projections; and generating a sinogram with a limited angle coverage of the target based on the plurality of physically corrected and geometrically calibrated 2D projections; updating the sinogram by at least inserting estimated data to a missing angle region of the sinogram; inputting the updated sinogram into a dual-domain neural network, wherein the dual-domain neural network includes: a first neural network trained to optimize a sinogram constructed based on limited angle fluoroscopic images, and a second neural network trained to optimize a 3D reconstruction that is generated based on the sinogram optimized by the first neural network; and obtaining a 3D volumetric image of the target as an output of the dual-domain neural network.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which:

FIG. 2 illustrates an exemplary image-guided bronchoscopy, in accordance with various embodiments.

FIG. 3B illustrates exemplary limitations of reconstructing 3D imaging based on portable C-arm x-ray devices in accordance with various embodiments.

FIG. 3C illustrates exemplary hardware solutions for achieving greater angle acquisition in accordance with various embodiments.

FIG. 4 illustrates an exemplary lung tumor discovery in accordance with various embodiments.

FIG. 5 illustrates an exemplary workflow of an AI-powered 3D imaging reconstruction based on limited-angle fluoroscopic images in accordance with various embodiments.

FIG. 12B illustrates an exemplary training process of the dual-domain neural network for AI-powered 3D visualization in accordance with various embodiments.

FIG. 12C illustrates an exemplary training method of the dual-domain neural network for AI-powered 3D visualization in accordance with various embodiments.

FIG. 16 illustrates an exemplary method of using a dual-domain neural network for 3D visualization in accordance with various embodiments

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

Figure 1:
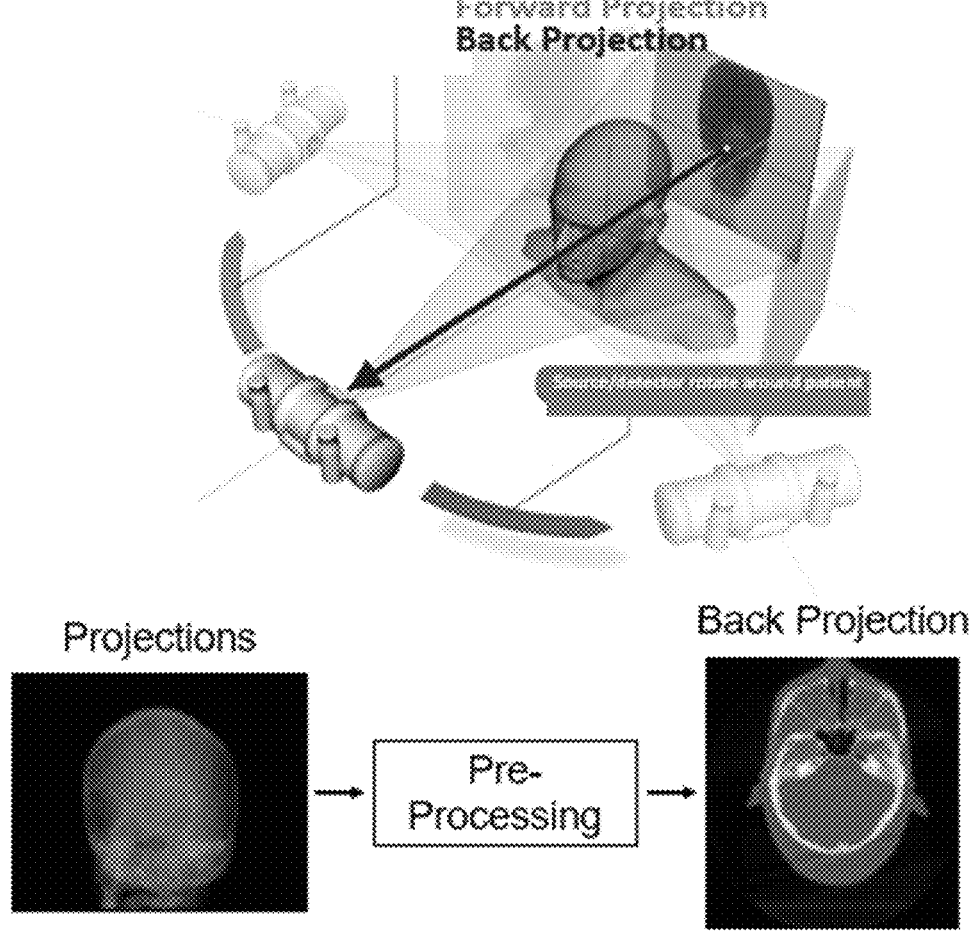
FIG. 1 illustrates an exemplary Cone Beam Computed Tomography (CBCT) scan process in accordance with various embodiments.

FIG. 1 illustrates an exemplary Cone Beam Computed Tomography (CBCT) scan process in accordance with various embodiments. In this process, the detector acquires 2D projections by emitting an x-ray beam and rotating around the imaging subject, such as a patient or a specific body part of the patient, within the rotational range allowed by the device housing the detector. At each angle of rotation, the detector captures a 2D projection, representing the cumulative attenuation of x-ray beams by different tissues along the beam's path. These 2D projections are subsequently pre-processed to mitigate artifacts, including scatter correction (to address scattering of the x-ray beam), beam hardening correction (to adjust for variations in beam intensity), and normalization. In some embodiments, the pre-processed 2D projections undergo analytical reconstruction using filtered back projection, transforming them into a three-dimensional image domain. This process may include metal artifact reduction to enhance image quality.

While 2D projections alone may offer limited contrast for visualizing soft tissues, 3D reconstruction significantly enhances the detail and contrast, particularly for soft tissues. The pre-processing stage involves implementing a pipeline for physical corrections to the 2D projections. These corrected projections are then subjected to filtered back projection, an analytical reconstruction algorithm that applies a convolution filter to remove blurring and produce high-quality 3D volumetric images. For a complete 3D reconstruction, a minimum coverage of 180 degrees plus a fan angle determined by system geometry of rotation in the 2D projections is typically required. Reconstruction with limited angle coverage, less than the required data sufficiency, can alleviate the issue of tissue overlap and enhance the visibility of objects at the focal plane. However, this method has a drawback: objects located off the focal slices in the 3D coordinate system may appear blurred.

FIG. 2 illustrates an exemplary image-guided bronchoscopy, in accordance with various embodiments. The illustrated image-guided bronchoscopy utilizes CBCT-enabled augmented reality (AR) fluoroscopy for identifying nodule location for electromagnetic navigated bronchoscopy (ENB) biopsy (e.g., lung tumor biopsy). Note that the procedure illustrated in FIG. 2 is not widely accessible because of resource constraints (e.g., lack of affordable and accessible CBCT system). This rest of the disclosure describes an AI-assisted solution using existing limited hardware resources to achieve comparable results as the procedure illustrated in FIG. 2.

In some embodiments, a CT scan (Computed Tomography) is first performed on the patient using a diagnostic CT scanner before performing the biopsy, which may be referred to as pre-operative planning CT scan or a prior diagnostic CT scan. The diagnostic CT scan acquires a full-angle imaging of the target (e.g., a body part of a patient), which allows a high-quality 3D reconstruction to identify the location of a tumor. Then during the procedure, an operator may operate a C-arm device to capture only 2D images in real-time, and forward project the tumor location learned from the 3D reconstruction to the 2D images. With the projection of the tumor location in the 3D reconstruction, the operator may impose the tumor location on the 2-D images. Note that the diagnostic CT is captured before the procedure (so is the 3D reconstruction), and the 2D images are captured during the procedure in real-time. While the 2D images only provide limited contrast for soft tissues (e.g., tumor), the projection from the 3D reconstruction to the 2D images empowers the operator to identify the tumor location in real-time and provide guidance (e.g., whether the operator's probe is actually reaching the tumor or a real cancer tissue).

Figure 3A:
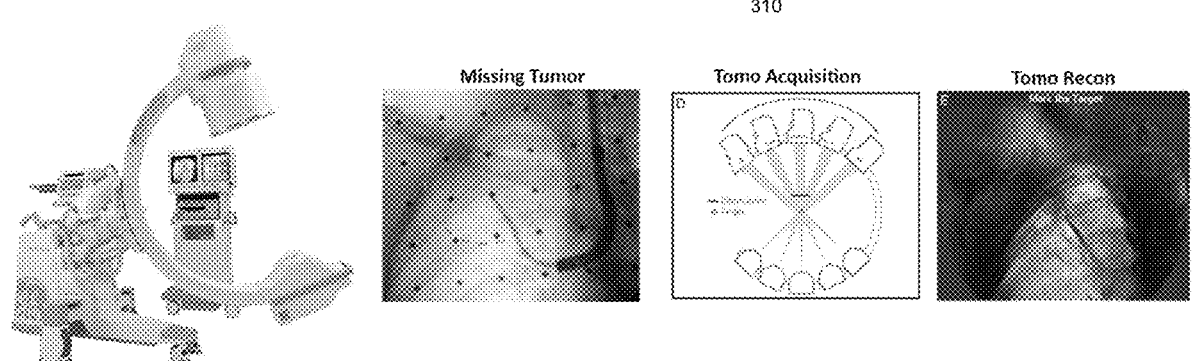
FIG. 3A illustrates an exemplary portable C-arm x-ray device and an exemplary application in accordance with various embodiments.

An example is illustrated in FIG. 3A, which shows an exemplary portable C-arm x-ray device on the left. The right portion of FIG. 3A illustrates the 2D imaging acquisition with a limited angle (e.g., a 50-degree angle) captured by the C-arm (see 310, Tomography Acquisition).

Although full-angle CBCT systems offer advanced imaging capabilities, their availability in medical facilities is notably scarce. Today, most operating rooms are equipped with limited-angle 2D imaging devices, such as C-arm devices, limiting them to 2D projection images. Addressing this challenge necessitates practical solutions beyond the costly expansion of CT or CBCT facilities. Alternatives include developing dedicated systems capable of capturing 2D projection images from a greater angle and then transforming these 2D projections into pseudo-3D images. However, these hardware-based solutions may require several years to prove their feasibility and practicality. Some example hardware-based solutions are illustrated in FIG. 3C. These hardware-based solutions are modalities with acquisition angle similar to Tomography (e.g., Computed Tomography) but much less than CBCT that can achieve 200 degrees of acquisition.

Because of the limited accessibility to the CT rooms, today's common practices also include manually rotating the standard C-arm system to acquire a gantry for a limited angle (30-60 degrees) to perform a partial-3D reconstruction. These approaches have various limitations such as low-quality reconstruction, error-prone due to motion artifact, lesions close to the patient surface may not be visualized, atelectasis can obscure lesions, not being applicable to sites other than the lung (lung region is relatively simple and composed of airs, so poor quality images may be acceptable; other regions with complex bone structures or dense tissues, higher quality images with higher contrast are necessary to identify the tumors). FIG. 3B illustrates exemplary limitations of reconstructing 3D imaging based on a portable C-arm x-ray device in accordance with various embodiments. As shown, vibrations caused by various factors such as manual rotation or other factors may result in blurry 3D reconstructions.

To address the above issues, this disclosure describes a software-based solution, in which a physics-informed AI model is trained to help reconstruct high-quality 3D imaging (also called 3D reconstruction or 3D visualization) based on limited angle 2D imaging acquisitions (also called 2D projections). The physics-informed AI model includes a set of universal function approximators (e.g., in a form of a neural network) that can embed the knowledge of prior physical and geometry information that govern a given dataset in the learning process. The prior knowledge in the training of the AI model (e.g., the neural network) as a regularization agent that limits the space of admissible solutions, increasing the correctness of the function approximation. In a nutshell, this AI-powered 3D medical imaging reconstruction process may include three key steps.

Step 1 includes an auto-calibration algorithm (also called auto-registration algorithm) that makes accurate and geometric calibration on the fly without pre-calibration efforts. This step adjusts the errors caused by the mechanical instability of the C-arm gantry and improve the robustness of the data acquisition. In some embodiments, the auto-calibration is partially based on prior knowledge or ground truth information. The prior knowledge or ground truth may include prior CT or preoperative CT, or shape or pattern information of one or more physical objects (often referred to as phantom), depending on the use cases. The auto-calibration gives a geometric information of each 2D projection data from the C-arm to enable spatially shifting each projection to achieve a circular trajectory among the 2D projections for 3D reconstruction.

Step 2 includes a physical correction to remove non-ideal artifacts to improve the quality of the acquired 2D projections. This step is to further improve the quality of the final 3D reconstruction.

Step 3 includes feeding the acquired images into a trained AI model, in particular, a dual-domain neural network, to convert the limited angle acquisition to a high-quality CT level image. The dual-domain neural network presumes that the 2D projections follows the circular trajectory (as a result of the auto-calibration), and perform limited angle reconstruction by taking into account of the calibration information (e.g., sinogram inpainting, see below for details).

This AI-powered 3D medical imaging reconstruction process only requires 30~50% of the data required by traditional scanner-based 3D reconstruction to construct similar quality of 3D images. This approach significantly reduces the radiation dose requirement and improves clinical efficiency.

Figure 12A:
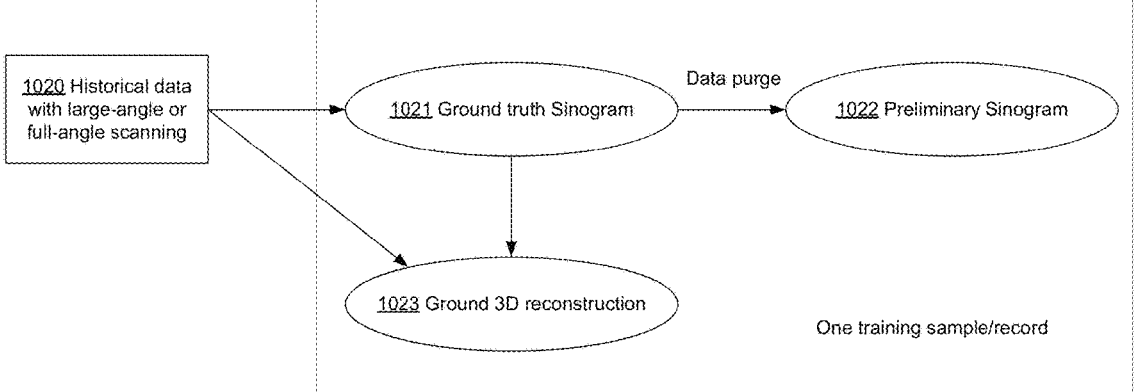
FIG. 12A illustrates an exemplary training data collection and preprocessing for training the dual-domain neural network in accordance with various embodiments.
Figure 13:
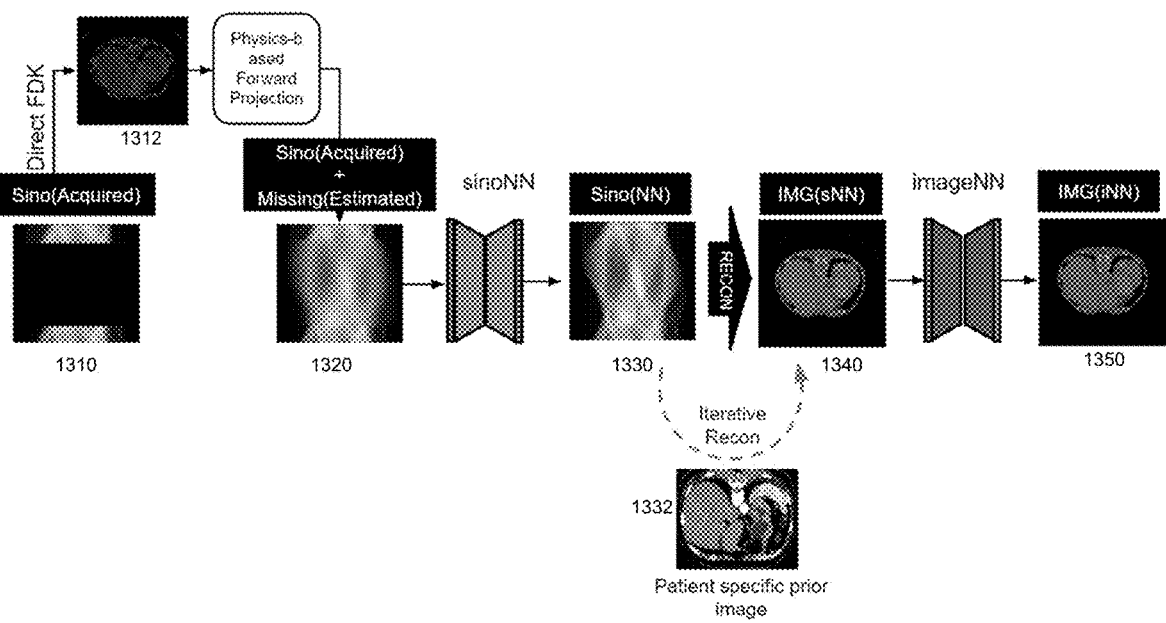
FIG. 13 illustrates an exemplary inferencing process of the dual-domain neural network for AI-powered 3D visualization in accordance with various embodiments.

In the following description, FIG. 9 describes the auto-calibration, and FIGS. 10-11B describe the physical correction, including scatter correction. FIGS. 12A-13 describe the training data preparation, training process, and inferencing process of the dual-domain neural network.

This process may be used for various image guidance procedures (bronchoscopy, spine surgery, brain surgery, and other cardiac surgeries) and significantly improve the quality of 3D guidance. End-user products using this process may be a compact and portable device that can be fit into any clinical workflow seamlessly.

FIG. 4 shows an example where a lung tumor can be missed in 2D projection but immediately shows up using 3D imaging reconstruction. The goal of the AI-powered 3D imaging reconstruction described herein is to convert the imaging on the left to the imaging on the right. The imaging on the left refers to conventional chest radiography CXR, in which the tumor location is marked by the arrow, but the operator cannot confirm the location of the bronchoscopy in 3D coordinates due to the lack of the depth information in the CXR. The imaging on the right refers to a computed tomography CT-quality level image that allows the operator to guide the bronchoscopy anywhere in 3D coordinates. Once the 3D location of a target is established, such an imaging system may be configured with algorithms to provide the physician with near real-time guidance for navigating tools used for biopsies or treatment to their proper location.

FIG. 5 illustrates an exemplary workflow of an AI-powered 3D imaging reconstruction based on limited-angle fluoroscopic images in accordance with various embodiments. The workflow steps in FIG. 5 are for illustrative purposes only. Depending on the implementation, the workflow may include fewer, more, or alternative steps.

In some embodiments, the workflow starts with receiving prior information of the patient or a body region of the patient. The prior information may include a preoperative CT scan with specific treatment plan sketched on, shape or pattern information of physical objects used during the CT scan, real-time optical tracking data from one or more optical sensors (e.g., LIDAR, 3D scanner or camera) tracking the device that captures the plurality of 2D projections (e.g., movement or geometrical parameters/trajectories of the device), or other geometric information of the imaging system obtained externally (using Light Detection and Ranging (LIDAR) devices, rangefinder, etc. installed near or on the C-arm device). The physical object is sometimes referred to as a phantom, and may be placed in the scanning area of the C-arm during calibration. The physical object contains reference markers or fiducials, which are easily identifiable points in the 2D images. These markers are used to determine the spatial relation between the camera (C-arm) and the object. By analyzing how these markers appear in different 2D projections, software can calculate and adjust the imaging parameters of the C-arm. This adjustment ensures that the 2D projections follow the assumed circular trajectory, which is crucial for accurate 3D reconstruction.

An alternative approach to determining the geometric relationship between the X-ray source and the detector involves utilizing identifiable reference points on both the X-ray source and the detector. These reference points can then be accurately measured from a distance using methods such as LIDAR systems or through reflectometry techniques.

However, even though the accuracy of the prior information is generally high, the time difference between the day acquiring the prior information and the surgery day may potentially lead to anatomical mismatch due to the movement of internal organs. This mismatch is minimal in rigid regions where the relative motion between structures are small (e.g., brain, skull), while it is challenging for non-rigid regions with abundant soft-tissues (e.g., lung, abdomen) that are prone to motion. As such, it is still critical to have in-suite 3D visualization, which can be used by navigation systems, for tool tracking or placement verification, etc. The AI-powered 3D imaging reconstruction would serve this purpose, with the prior information as additional free prior information for quality control.

In some embodiments, the prior information is optional. Without the prior information, the AI model can still perform high-quality 3D visualization based on knowledge learned from historical CTs from a pool of patients. The only difference is that the 3D reconstruction would be more accurate by considering the prior information of the specific patient.

Then the workflow continues to obtain limited angle fluoroscopic images (e.g., captured by C-arm devices) after the patient is in the operating room. This step also includes automatic geometric calibration based on the prior information and AI augmented 3D reconstruction. FIGS. 12A-13 describe the AI model with more details.

In some embodiments, with the 3D volumetric images reconstructed, the next step includes displaying to the user (doctor, surgeon, patient, nurse, etc.) through a portable tablet or other suitable displaying device. The real-time display helps surgeons or medical personnel to have full control of the procedure management.

In some embodiments, the workflow also allows detection of surgical instruments in real-time intra-operative projections, and simultaneously register the 3D pose. For example, in a spine surgery or brain surgery that requires placement of known surgical instruments, the 3D visualization generated by the AI model may be aligned with images generated by a navigation system by using a plurality of optical reference points (e.g., using the known shape and pattern of the surgical tools or optical objects).

Figure 6:
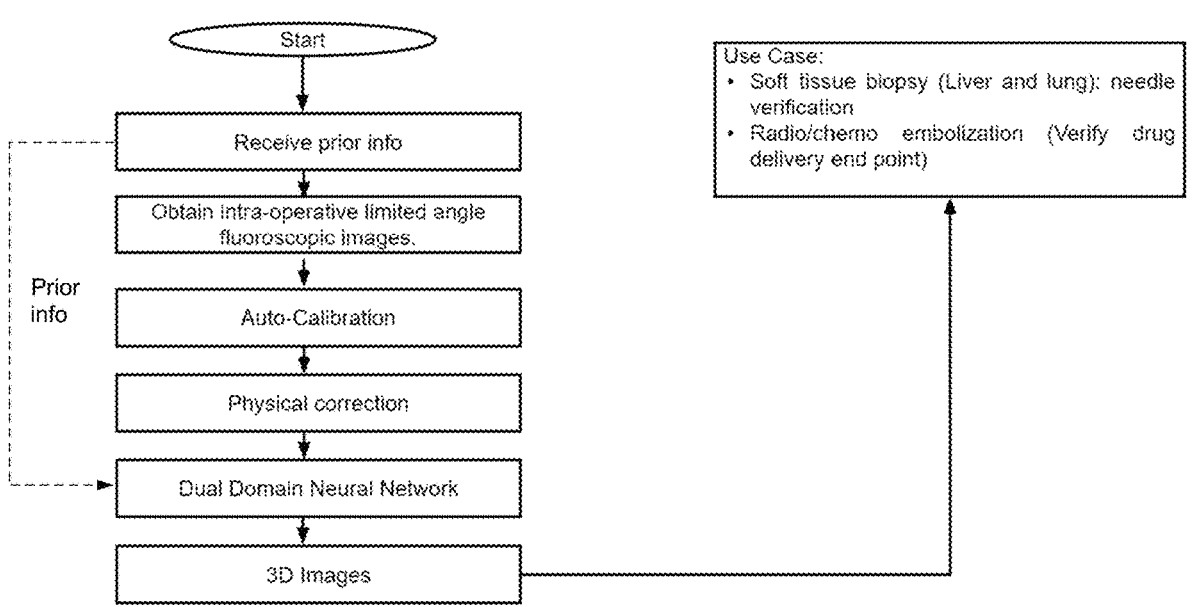
FIG. 6 illustrates an exemplary workflow of using the AI-powered 3D imaging reconstruction for in-suite post-procedure CBCT on non-rigid body parts, in accordance with various embodiments.

FIG. 6 illustrates an exemplary workflow of using the AI-powered 3D imaging reconstruction for in-suite post-procedure CBCT on non-rigid body parts, in accordance with various embodiments. This workflow may be executed by a computer system to perform a biopsy on soft tissues such as lung biopsy, liver biopsy, etc. In these procedures, since there are no rigid body parts to define the target region, reference marker(s) (e.g., highly-attenuated metal beads located in a precisely known geometry on the surface) may be defined as reference points for auto registration. Once the auto registration is done, the computer system may perform auto-calibration and physical correction to generate high-quality images. These high-quality images may then be fed into the AI mode, i.e., a dual-domain neural network, to perform 3D image reconstruction. The reconstructed 3D image may help the doctor or physician to determine whether the surgical tool (e.g., a needle) has reached the target region (e.g., a tumor).

As explained above, direct reconstruction of projections collected from a limited angle (e.g., using a portable C-arm device) would expect severe structural distortions. To generate high-quality limited angle 3D reconstruction, the dual-domain neural network performs alternating cross-session training between projection and image domains. In some embodiments, the dual-domain neural network may optionally incorporate, when inside the operating suite, prior information (such as the patient planning CT (if available), the known shape/pattern of a physical object, or real-time optical tracking data of the C-arm while capturing the plurality of 2D projections) as additional constraints on one or more layers of the networks for fine tuning. The dual-domain neural network may include a first domain or a first neural network that is trained to fill in more pixels to a sinogram generated based on the 2D images collected from a limited angle. The pixel-enriched sinogram may be used to generate a 3D reconstruction. The dual-domain neural network may include a second domain or a second neural network trained to optimize the 3D reconstruction by further suppressing the artifacts therein. For instance, if a threshold for high-quality 3D reconstruction is 180 degrees of image acquisition and the current 2D image acquisition device can only capture 100 degrees of images, the first domain of the dual-domain neural network is trained to fill in 80 degrees more (or at least 80 degrees more) of synthetic images. Finally, during the inference stage, the AI model generates the limited angle 3D volumetric images, referred as augmented CBCT, which can be further improved or fine-tuned using the planning CT information.

Similar to soft tissue biopsy, the workflow illustrated in FIG. 6 may also be applied to other soft-tissue-involved procedures, such as radio/chemo embolization procedures to verify drug delivery to the target region/tissue. For instance, the doctor or physician mixes the radio-opaque (e.g., the drug) with the contrast agents in the visualization for them to guide the injection of the drug. With the contrast (which is proportional to the amount of drugs delivered), the doctor or physician is able to see where the flow of the drug under the fluoroscopy. An augmented CBCT further helps to quantify the amount of drug delivered from the residue contrast.

Figure 7:
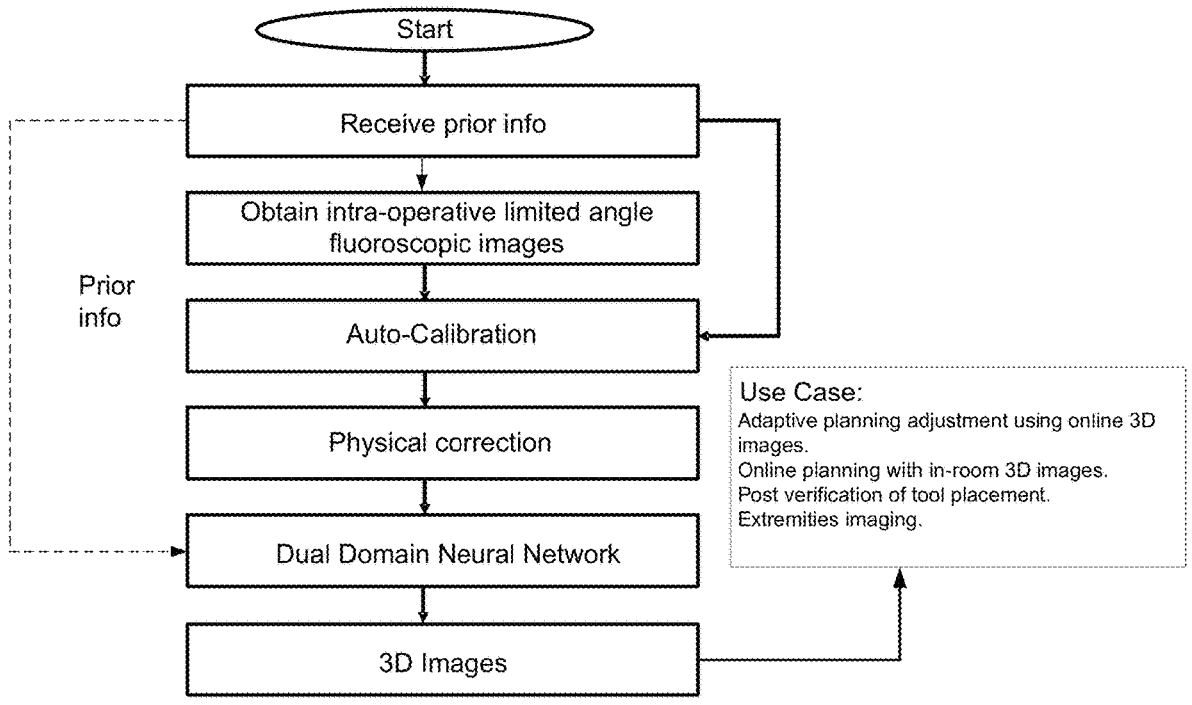
FIG. 7 illustrates an exemplary workflow of using the AI-powered 3D imaging reconstruction for in-suite post-procedure CBCT on rigid body parts, in accordance with various embodiments.

FIG. 7 illustrates an exemplary workflow of using the AI-powered 3D imaging reconstruction for in-suite post-procedure CBCT on rigid body parts (e.g., such as in the skull or spine), in accordance with various embodiments. Different from the applications with non-rigid body parts illustrated in FIG. 6, the auto-calibration may be directly based on the prior information to spatially adjust the 2D fluoroscopic images to form an accurate circular trajectory. In addition, when the dual-domain neural network performs 3D reconstruction based on the calibrated (and physically corrected) 2D images, it assumes that the 2D images are in a circular trajectory. Optionally, the prior information may also be considered to fine-tune the 3D images. As shown in FIG. 7, the prior information may be used for both the "auto-calibration" step and the "dual-domain neural network" step. The rest of the steps are similar to FIG. 6. The workflows in both FIGS. 6 and 7 may be used for post-surgery verification. Some example use cases of the process in FIG. 7 includes adaptive planning adjustment, online plaining with in-room 3D images, post verification of tool placement, extremities imaging, etc.

Figure 8:
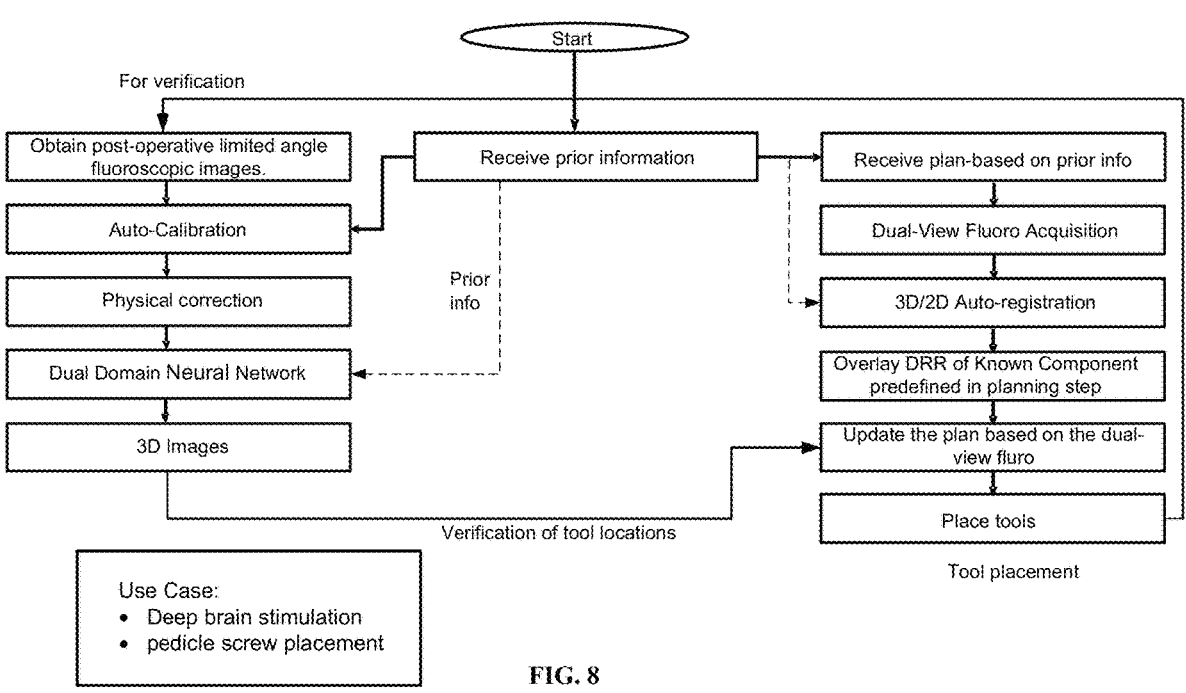
FIG. 8 illustrates an exemplary workflow of using the AI-powered 3D imaging reconstruction to improve surgical tool placement accuracy, in accordance with various embodiments.

FIG. 8 illustrates an exemplary workflow of using the AI-powered 3D imaging reconstruction to improve surgical tool placement accuracy, in accordance with various embodiments. The workflow may be executed by a computer system. This workflow may include two branches: the first branch on the left of FIG. 8 that is similar to the workflow in FIG. 7, and the second branch one on the right of FIG. 8 for guiding the placement of a surgical tool. The two branches may share the same prior information (e.g., the pre-operative planning CT, other types of known shapes/patterns of physical objects, or real-time optical tracking data of the C-arm) and have a bridging data flow from the end of the second branch to the beginning of the first branch. The branch on the right may be used to provide guidance for surgical tool placement. The guided tool placement at the end of the branch on the right in FIG. 8 may be further verified by using the branch on the left through the bridging data flow.

For example, after obtaining prior information of a rigid part on a patient, simple dual-view images (e.g., two 2D views that are acquired at different angles (around 90° apart, $\Delta\theta \sim 90°$) may be used to guide the surgical tool toward the target region. The computer system may perform auto-registration/calibration based on the dual-view images and the prior information (e.g., register the target to the dual-view images based on the prior information). Then the computer system may simulate the surgical tool (called overlay) to visualize whether the tool is reaching the target region that is predefined in the planning step. Specific use cases may include deep brain stimulation and pedicle screw placement. The surgical tool placement data may be verified in real-time or post-surgery using the verification branch, which involves the AI-powered 3D imagining reconstruction. The reconstructed 3D images may then be used for the above-described use cases for verification purposes.

Figure 9:
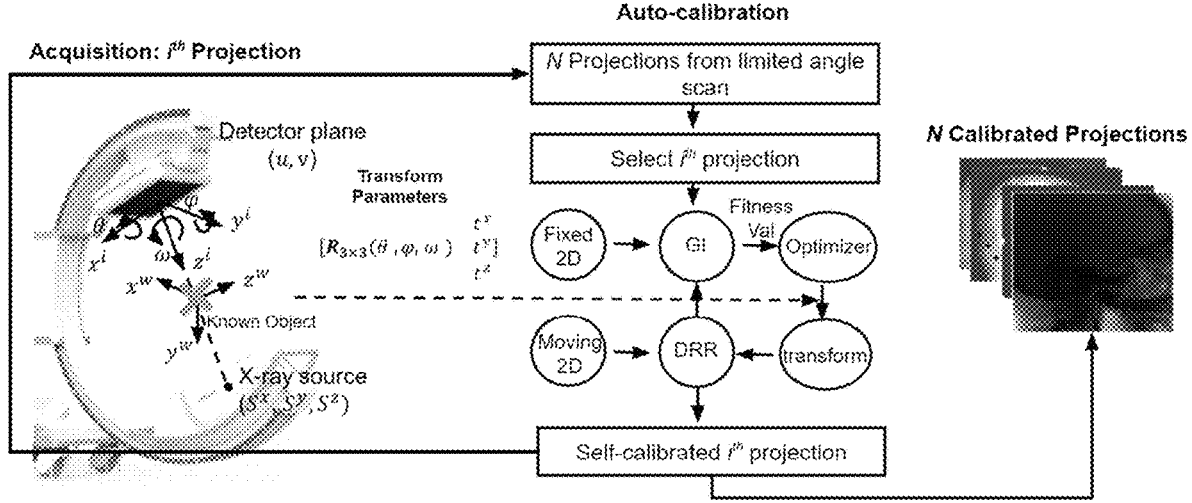
FIG. 9 illustrates an exemplary method of auto self-calibration in the AI-powered 3D reconstruction in accordance with various embodiments.

FIG. 9 illustrates an exemplary method of auto self-calibration in AI-powered 3D reconstruction in accordance with various embodiments. The method illustrated in FIG. 9 focuses on auto-calibration when there is no fiducial, i.e., there is no ground truth data from pre-operative planning CT. The auto-calibration with fiducial may be inferred by a person skilled in the art by utilizing the additional information in the fiducial.

A basic x-ray imaging system is usually modeled using a few parameters, i.e., x-ray source location ($S^x$, $S^y$, $S^z$), detector coordinates (u, v) and source to detector distance (SDD), which are referred as intrinsic parameters and can be characterized as matrix A, which is a calibrated term that provides transformation between an image point in 3D and a ray to project it. For a mechanically stable system, these parameters are well-constrained. For an unstable system as C-arm, the C-arm position relative to the imaging object/patients translation (T(x, y, z)) and rotation (R($\theta$, $\varphi$, $\omega$)) need to be modeled, which are referred to as extrinsic parameters. Therefore, a projection matrix (PM) that describes the system gantry motion includes both intrinsic and extrinsic parameters, P=[AR, AT]. Jitter in the C-arm orbit can cause variability in the PMs, particularly in the extrinsic parameters. The auto-calibration method is essentially using 3D-2D registration of the known 3D object and its x-ray projections to identify the system rotating trajectory, which is defined as a projection matrix. The projection matrix can be determined from the 3D information of a known structure, either experimentally through imaging of a phantom (a physical object) of known geometry or through patient self-calibration based on their own rigid anatomy. The latter represents one of the uniqueness of the disclosed method, where the anatomy is acquired through the high-quality planning CT images. The optimal 3D-2D registration results between online projection (fixed 2D) and digitally reconstructed radiography (DRR) are achieved using numerical optimization strategies like covariance matrix adaptation evolution strategy (CMA-ES). In some embodiments, the gradient information (GI) may be used as the input to CMA-ES. Accurate estimation of the projection matrix can be done through direct computation algorithms. The derived projection matrix may then be used for image reconstruction.

In some embodiments, the auto-calibration process may rely on geometric data obtained by placing one or more calibration phantoms near the isocenter. Alternatively, the geometric data may be obtained through real-time sensory data that tracks the movement of the C-arm device. The geometric data may be used to generate the transformation matrix for calibration.

As an example, the tracked movement data may be gathered by remote sensing devices strategically positioned near the scanning apparatus. These devices, which may include optical rangefinders employing IR (Infrared) and microwave technologies, as well as LIDAR (Light Detection and Ranging), are precisely calibrated to align with the C-arm's imaging geometry. The goal is to accurately track the 3D coordinates of the C-arm x-ray source and detector at each frame, where multiple tracking devices might be positioned at different angles to capture the complete 3D view of the C-arm system. They can be variously positioned—mounted on room walls, embedded in the floor, or suspended from the ceiling, depending on the room layout. A timing log is implemented to trigger both systems in order to synchronize the acquisition of C-arm and Lidar.

Optical tracking with 3D scanning function can also be used for real-time dose rate tracking. The real-time dose rate tracking refers to a process that monitors and adjusts the radiation dose delivered to a patient during diagnostic procedures, such as X-ray, fluoroscopy, or computed tomography (CT) scans. This technology is crucial for safeguarding the safety of patients, doctors, and staff by reducing radiation exposure, while still maintaining the image quality needed for precise guidance. A real-time rendering of the C-arm system can be fed into GPU Monte-Carlo simulation for dose estimation. By setting up the x-ray tube parameters during image acquisition, the Monte-Carlo simulation results provide the dose cloud of the surrounding environment, which can be used for managing radiation exposure for personalized radiation dosimetry.

Integration of these sensors with the C-arm device is pivotal. The tracking data from the sensors may be synchronized with the scanning images from the C-arm, allowing both data sets to be transmitted concurrently in real-time to a server for effective calibration. The synchronization between the sensors and the C-arm device may be implemented through wired connection or wireless connection with low latency, ensuring consistent and timely communication.

To bolster system reliability and safeguard patient safety, especially in scenarios of remote sensor failure, certain embodiments incorporate fail-safes and redundancy features. These may include the deployment of additional sensors and the establishment of dual tracking systems.

Figure 10:
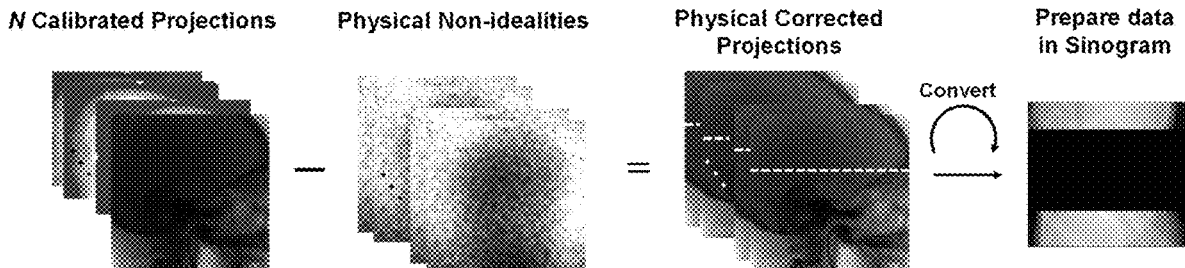
FIG. 10 illustrates an exemplary method of physical correction in the AI-powered 3D reconstruction in accordance with various embodiments.

FIG. 10 illustrates an exemplary method of physical correction in the AI-powered 3D reconstruction in accordance with various embodiments. The overall process of physical correction is to remove physical non-idealities from the calibrated projections from the auto-calibration process. The outcome of the physical correction may include a plurality of physically corrected projections. The physically corrected projections may be converted into a sinogram as an input for the dual-domain neural network. As a specific example, the physical correction process may include scatter correction, which are illustrated in FIGS. 11A and 11B.

Figure 11A:
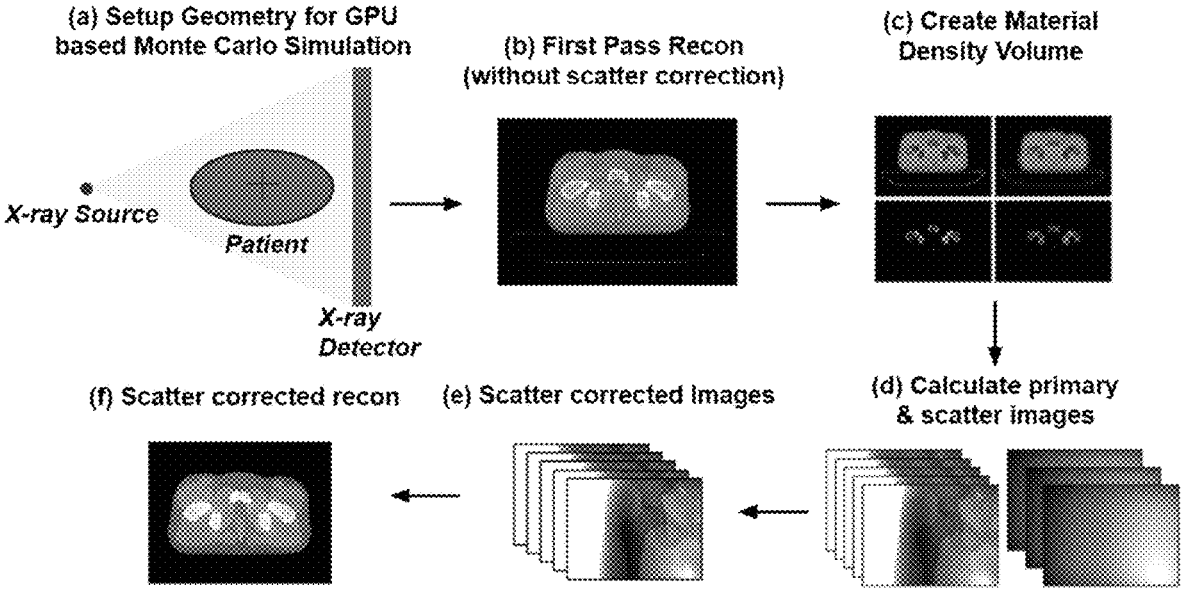
FIG. 11A illustrates an exemplary method of physics-based correction in accordance with various embodiments.
Figure 11B:
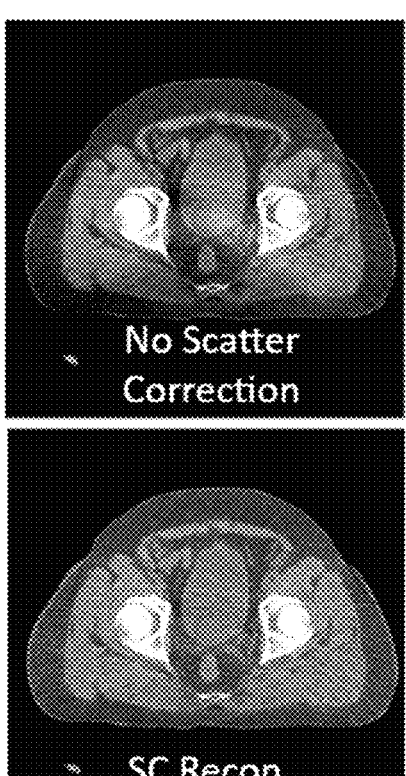
FIG. 11B illustrates an exemplary effect of scatter correction in accordance with various embodiments.

FIG. 11A illustrates an exemplary method of physics-based correction in accordance with various embodiments.

Physics-based correction corrects scatter fractions in the images. Scatter correction is one example of physics-based correction. In CT imaging, as X-rays pass through an object, some rays are absorbed or deflected, a phenomenon known as scatter. This scatter results in false signals on the detector, leading to artifacts in the final image, typically manifesting as dark or streaky areas that reduce the image's clarity and diagnostic value. A standard and efficient approach to figure out the primary and scatter components is using Monte-Carlo simulation. A graphic processing unit (GPU)-enabled platform can achieve real-time estimation with superior computational speed. As shown in FIG. 11A, the image (b) without scatter correction is dark and has poor reconstruction quality, even when there is full-angle image acquisition.

In some embodiments, the scatter artifacts may be removed from the original CBCT based on the planning CT images (pCT in FIG. 11A). These algorithms estimate scatter based on the known properties of the scanned object and the geometry of the CT system. Some example real-time scatter estimation methods may include using a graphic processing unit (GPU)-based real-time Monte Carlo Simulation. FIG. 11B illustrates an exemplary effect of scatter correction in accordance with various embodiments. The comparison in FIG. 11B shows the quality difference between 3D reconstructions with and without scatter correction.

FIG. 12A illustrates an exemplary training data collection and preprocessing for training the dual-domain neural network in accordance with various embodiments. This phase involves acquiring initial training data. Throughout the training phase, the training data may be dynamically augmented by incorporating the intermediate outputs generated by the dual-domain neural network.

In some embodiments, the training data may be constructed by (1) selecting historical CT scanning data 1020 of training subjects (e.g., patients), where the CT scanning data 1020 have large-angle or full-angle coverage; (2) synthesizing ground-truth sinograms 1021 from the historical CT scanning data; (3) constructing ground-truth 3D reconstructions 1023 based on the ground-truth sinograms; and (4) constructing preliminary sinograms 1022 with missing data to simulate the limited angle tomography (e.g., C-arm scanning).

The term "large-angle or full-angle scanning" here denotes historical data encompassing a rotational coverage of approximately 180 degrees or more. This comprehensive scanning range facilitates the creation of high-quality sinograms and 3D reconstructions, serving as essential ground truth data in training the dual-domain neural network.

Additionally, preliminary sinograms 1023 can be generated by removing parts of the ground-truth sinograms 1021 to simulate missing angles that often occur in practical settings. For instance, between 50% to 90% of data might be removed from the ground-truth sinograms 1021 to create these preliminary versions.

FIG. 12B illustrates an exemplary training process of the dual-domain neural network for AI-powered 3D imaging reconstruction in accordance with various embodiments.

In some embodiments, the dual-domain neural network includes two domains: a Sinogram Neural Network (sinoNN) and an Image Neural Network (imageNN). The sinoNN is trained to interpret and complete the patterns in sinograms, effectively addressing the gaps in data that arise from limited angle 2D image acquisition methods, such as those found in fluoroscopic imaging. This enables the generation of enhanced quality sinograms. Meanwhile, the imageNN focuses on refining the 3D image reconstructions derived from these optimized sinograms. This includes reducing artifacts, which may involve techniques such as adding, removing, or rearranging pixels in the subsequent 3D reconstructions. Both the sinoNN and imageNN undergo concurrent training over multiple iterations, with each iteration encompassing several stages of online self-augmented training. This joint training approach is integral to improving the overall efficiency and effectiveness of the image reconstruction process.

In describing the training process of the dual-domain neural network, it is assumed that the training data generation shown in FIG. 12A has been completed. In some embodiments, the training data generation may be carried out simultaneously with the training process.

As shown in FIG. 12B, the training process of the dual-domain neural network may start with preprocessing the preliminary sinogram 1202, which is analogous to the preliminary sinogram 1023 depicted in FIG. 12A. This preliminary sinogram often contains missing data or regions, visible as black sections in the figure. The aim of preprocessing is to estimate and fill in pixels within these missing areas to produce what is termed an estimated sinogram 1204.

In some embodiments, the preprocessing may include (1) generating a 3D reconstruction based on the preliminary sinogram 1202 (e.g., using algorithms like Feldkamp-Davis-Kress (FDK) algorithm), (2) performing physics-based forward projection on the 3D reconstruction 1203, and (3) merging the preliminary sinogram 1202 with the forward projection of the 3D reconstruction 1023 to fill in the estimated data to the missing parts, thereby obtaining the estimated sinogram 1204. Here, the forward projection is the simulation of how X-ray beams would pass through the 3D volume, producing 2D projections (or sinograms) from various angles. The merging step may include aligning the preliminary sinogram 1202 with the output of the forward projection, and inserting the newly generated projections to fill in the missing parts of the preliminary sinogram 1202.

The estimated sinogram 1204 is fed into the SinoNN, which optimizes the filled region in the estimated sinogram 1204 to minimize a loss (called sino-loss in FIG. 12B) between the inpainted sinogram 1205 and the ground-truth sinogram 1206 (called Sino(Ref) in FIG. 12B) image 1208, the full-angle sinogram, and the inpainted sinogram. Here, the ground-truth sinogram 1206 may be mapped to 1021 in FIG. 12A that corresponds to the preliminary sinogram 1202.

The sinoNN may include numerous parameterized layers, and the parameters of the layers (e.g., embedding layers, feature extraction filters) may be adjusted based on the sino-loss computed based on the sinogram 1206 and the ground truth sinogram 1208. For example, the sino-loss is fed back to the sinoNN through backpropagation to update the parameters of the sinoNN in order to minimize the sino-loss, e.g., through a gradient-based optimization algorithm. For instance, stochastic gradient descent uses the gradient of the error function with respect to the network parameters to update the parameters in the direction that reduces the error.

The inpainted sinogram 1205, i.e., the optimized sinogram, is then used to reconstruct another 3D reconstruction 1207, e.g., through Filtered Back Projection (FBP). The 3D reconstruction 1207 may be input into the imageNN for optimization. The imageNN may also include numerous parameterized layers that are trained to add, remove, or shuffle some of the pixels in the 3D reconstruction 1207, to obtain an optimized 3D reconstruction 1208. Again, the parameters of the imageNN layers may be adjusted to minimize an error (e.g., image-loss in FIG. 12B) computed based on the difference between the 3D reconstruction 1207 and the ground truth 3D reconstruction 1209. For instance, the image-loss is fed back to the imageNN through back-propagation to update the parameters of the imageNN in order to minimize the image-loss, e.g., through a gradient-based optimization algorithm. Similar to sinoNN, stochastic gradient descent may be used to update the parameters of imageNN in the gradient direction that reduces the error.

The training process of the dual-domain neural network is iterative in nature and may last for a plurality of iterations. The exit condition of the training process may include the sino-loss and the image-loss being below their respective thresholds.

In some embodiments, each training iteration of the dual-domain neural network is not only limited to the single-stage cross-domain optimization (including the forward and backward propagation steps) described above, but also incorporates a multi-stage online augmentation process. The multi-stage online augmentation is devised to refine the training of the neural network by leveraging augmented data, uniquely sourced from the network's own outputs. The key advantage of this self-augmented method is its ability to significantly expand the diversity of training data, thereby steering the network's optimization towards a more focused and constrained solution space.

For example, the enhanced 3D reconstruction 1208 may undergo a physics-based forward projection, resulting in a set of 2D projections or an augmented sinogram. This new data is then integrated with the preliminary sinogram 1202 to create a new training sample for another round of training. Since a portion of this new training sample originates from a prior stage of training, this methodology is also referred to as self-augmentation or online augmentation. This unique training approach not only facilitates effective cross-domain (cross sinogram domain and 3D image domain) optimization but also introduces more robust constraints and enhances error communication between the sinogram and image domains. Such a strategy proves instrumental in reducing computational demands and addressing common challenges like gradient vanishing throughout the optimization process. In some variations of this approach, the online augmentation might be executed in two stages within each training iteration, exemplifying its adaptability and strategic application in the training cycle.

The training process illustrated in FIG. 12B may be abstract as the method illustrated in FIG. 12C.

FIG. 13 illustrates an exemplary inferencing process of the dual-domain neural network for AI-powered 3D imaging reconstruction in accordance with various embodiments. After the dual-domain neural network is trained using the processes described in FIG. 12A and FIG. 12B, it may be used to compensate for the limited angle CT and reconstruct high-quality 3D images.

In some embodiments, after acquiring a patient's 2D images from a limited angle (e.g., using C-arm), geometric calibration and physical correction may be performed on these acquired images before generating the sinogram 1310 for inferencing. An implementation of such process is illustrated in FIG. 10.

In some embodiments, the geometric calibration may include spatially shifting the plurality of 2D images based on prior information of the target to achieve a circular trajectory among the plurality of 2D projections. The prior information may be in various forms to provide geometry information. Some example prior information may include a shape or a pattern of a physical object used during the capturing of the plurality of 2D projections, a prior computerized tomography (CT) scan of the target, or real-time optical tracking data collected by one or more optical sensors tracking the C-arm that captures the plurality of 2D projections. Encoders may be used to generate calibration data based on the collected sensory data.

In some embodiments, physical correction may be applied to these images. This includes processes such as scatter correction, as illustrated in FIGS. 11A and 11B. Subsequent to these corrections, the 2D projections undergo a transformation process to form a sinogram, referred to as the acquired sinogram 1310.

As shown in FIG. 13, the acquired sinogram 1310 may have a missing angle region (marked as black in 1310) due to the limited image acquisition. To fill in estimated data into the missing angle region, a first 3D reconstruction 1312 may be generated by applying algorithms like Direct FDK on the acquired sinogram 1310. Then the first 3D reconstruction 1312 may go through a physics-based forward projection, and the output may be merged with the acquired sinogram 1310 to obtain the estimated sinogram 1320. The estimated sinogram 1320 includes all pixels from the acquired sinogram 1310 as well as the pixels estimated from the 3D reconstruction 1312.

The estimated sinogram 1320 may feed into the sinoNN for optimization. The sinoNN, as described in FIG. 12B, is trained to optimize a sinogram constructed based on the limited angle fluoroscopic images. The output of the sinoNN is an optimized sinogram 1330. The optimized sinogram 1330 is a full-size sinogram with more filled-in and/or adjusted pixels.

Next, the optimized sinogram 1330 may be used to generate a second 3D reconstruction 1340. Since the sinogram 1330 is an optimized version of the sinogram 1310, the second 3D reconstruction 1340 also has a higher quality than the first 3D reconstruction 1312. In some embodiments, prior information may be used to further enhance the 3D reconstruction 1340. For instance, iterative reconstruction may be executed to generate the 3D reconstruction 1340 by using both the prior information of the target and the optimized sinogram 1330. Alternatively, Filtered Back Projection (FBP) may be executed to generate the 3D reconstruction 1340 based on the optimized sinogram 1330, without using the prior information. While Filtered Back Projection (FBP) is quicker, iterative reconstruction tends to yield higher quality 3D reconstructions.

The 3D reconstruction 1340 may be input into the imageNN for optimization. The optimization may include further suppressing artifacts in the 3D reconstruction 1340, thereby obtaining a 3D volumetric image 1350 of the target.

The inferencing process with the dual-domain neural network is efficient, functioning as a one-pass system. This approach drastically reduces computational complexity compared to the training phase. When a C-arm captures 2D projections, it can almost instantaneously generate 3D volumetric images. These images, displayed on a screen, have numerous practical applications, particularly in the medical field, such as 3D navigation during surgical procedures that involve probing tools and for confirming steps in interventional radiology.

For instance, a 3D volumetric image of a patient's body region can be synchronized (aligned) with navigation system images using multiple optical reference points, such as an optical target made up of several optically reflective balls. These aligned 3D images can be shown on a graphical user interface (GUI) to offer real-time guidance. This feature is especially useful for navigating the trajectory of a lead wire during a procedure, verifying the placement of a medical tool, or providing diagnostic assistance.

The dual-domain neural network described above, through its extensive learning during training, enables the sinoNN to effectively compensate for missing pixels in limited-angle 2D acquisitions, and the imageNN to substantially reduce artifacts in the resulting 3D images. This innovative approach necessitates only a fraction of the data traditionally required for scanner-based 3D reconstruction—approximately 30 to 50%, as evidenced by experimental outcomes. Consequently, this method not only maintains a similar quality in the reconstructed 3D images but also markedly diminishes the radiation dose needed for diagnostic procedures such as X-ray, fluoroscopy, or CT scans. This dual benefit of reduced radiation exposure and enhanced clinical efficiency represents a significant advancement in medical imaging technology.

Figure 14:
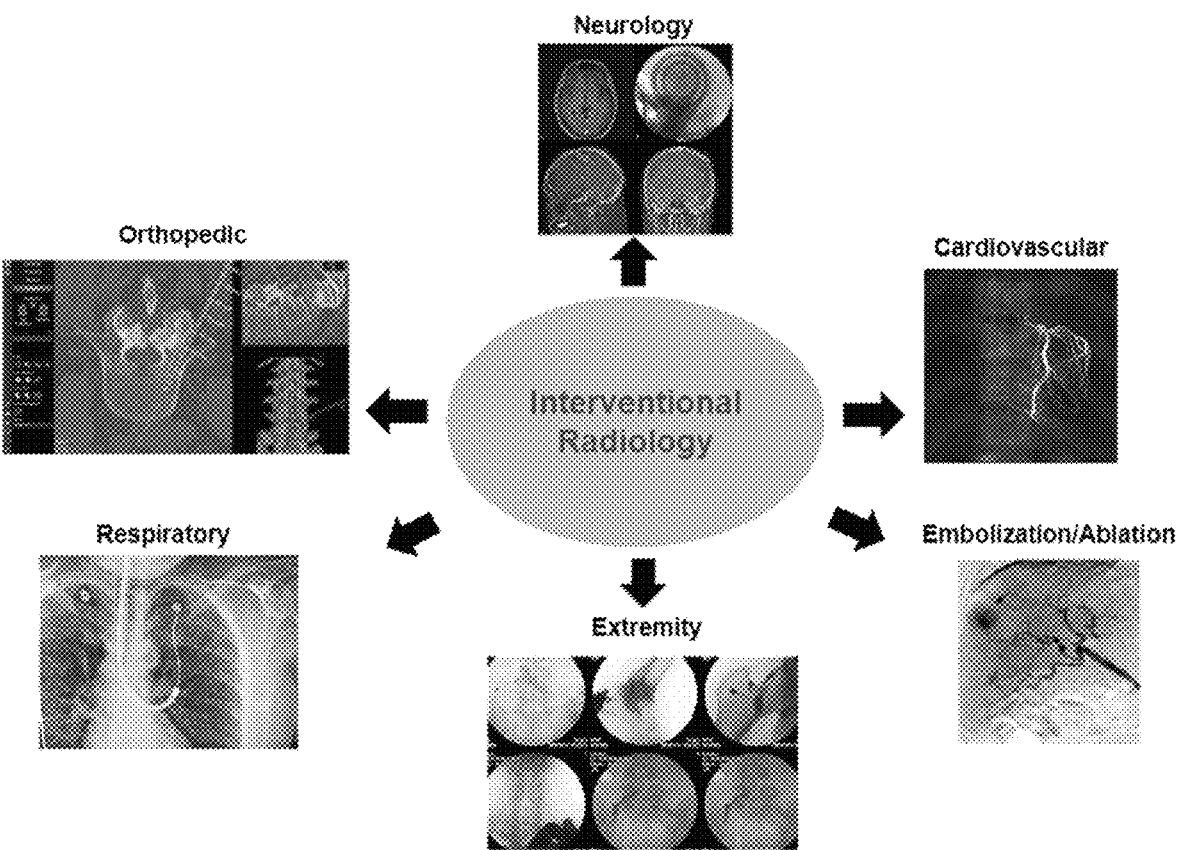
FIG. 14 illustrates exemplary applications of AI-powered 3D imaging reconstruction in accordance with various embodiments.

FIG. 14 illustrates the versatile applications of AI-powered 3D imaging reconstruction, as outlined in various embodiments. This advanced system and method find extensive use in a range of interventional radiology procedures. These include, but are not limited to, orthopedic interventions, respiratory system treatments, extremity imaging, and procedures involving embolization and ablation. Additionally, the technology holds significant promise in the field of Cardiology, demonstrating its adaptability and efficacy across diverse medical disciplines.

Figure 15:
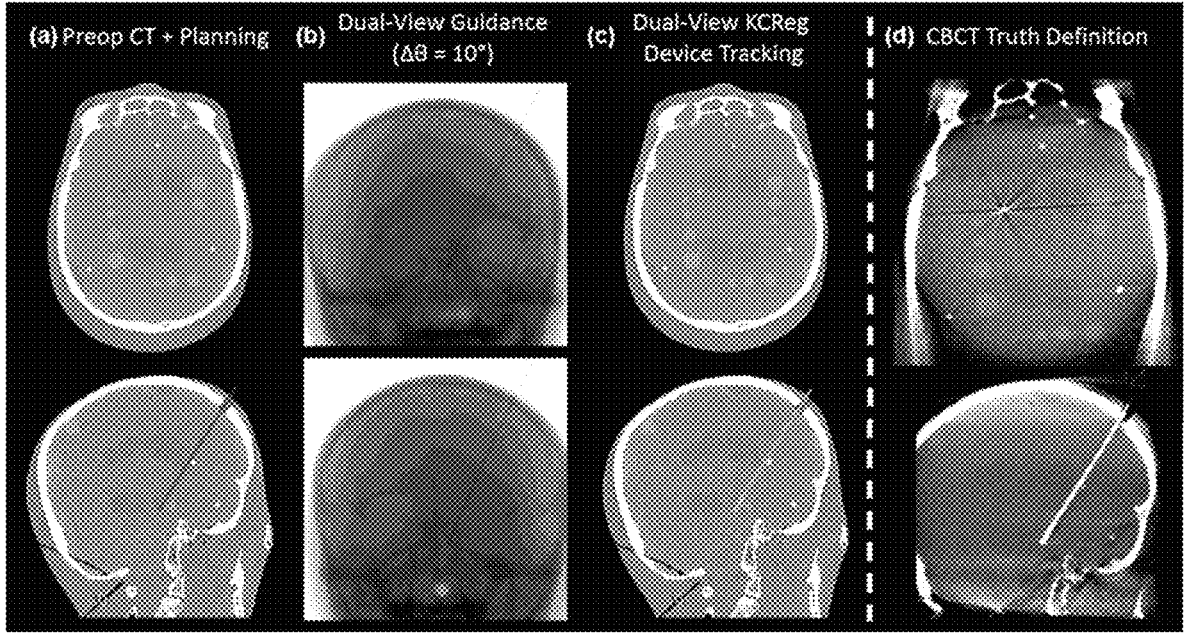
FIG. 15 illustrates the combined applications of real-time surgical tracking (Deep brain stimulation lead) using known component registration and the final position verification using AI-powered 3D imaging reconstruction.

FIG. 15 illustrates the combined applications of real-time surgical tracking (deep brain stimulation lead) using known component registration (b) and the final position verification using AI-powered 3D imaging reconstruction (d).

The performance of certain of the operations may be distributed among the processors equipped with memories, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

FIG. 16 illustrates an exemplary method of using a dual-domain neural network for 3D visualization in accordance with various embodiments. In some implementations, one or more process blocks of FIG. 16 may be performed by a device.

As shown in FIG. 16, process 1600 may include capturing a plurality of 2-dimensional (2D) projections of a target that cover a limited angle of the target (block 1610). For example, a device may capture a plurality of 2-dimensional (2D) projections of a target that cover a limited angle of the target, as described above.

As also shown in FIG. 16, process 1600 may include performing geometric calibration and physical correction on the plurality of 2D projections of the target to obtain a plurality of physically corrected and geometrically calibrated 2D projections (block 1620). For example, the device may perform geometric calibration and physical correction on the plurality of 2D projections of the target to obtain a plurality of physically corrected and geometrically calibrated 2D projections, as described above.

As further shown in FIG. 16, process 1600 may include generating a sinogram with a limited angle coverage of the target based on the plurality of physically corrected and geometrically calibrated 2D projections (block 1630). For example, the device may generate a sinogram with a limited angle coverage of the target based on the plurality of physically corrected and geometrically calibrated 2D projections, as described above.

As also shown in FIG. 16, process 1600 may include updating the sinogram by at least inserting estimated data to a missing angle region of the sinogram (block 1640). For example, the device may update the sinogram by at least inserting estimated data to a missing angle region of the sinogram, as described above.

As further shown in FIG. 16, process 1600 may include inputting the updated sinogram into a dual-domain neural network, where the dual-domain neural network may include: a first neural network trained to optimize a sinogram constructed based on the limited angle fluoroscopic images, and a second neural network trained to optimize a 3D reconstruction that is generated based on the sinogram optimized by the first neural network (block 1650). For example, device may input the updated sinogram into a dual-domain neural network, where the dual-domain neural network may include: a first neural network trained to optimize a sinogram constructed based on the limited angle fluoroscopic images, and a second neural network trained to optimize a 3d reconstruction that is generated based on the sinogram optimized by the first neural network, as described above.

As also shown in FIG. 16, process 1600 may include obtaining a 3D volumetric image of the target as an output of the dual-domain neural network (block 1660). For example, the device may obtain a 3d volumetric image of the target as an output of the dual-domain neural network, as described above.

As further shown in FIG. 16, process 1600 may include 2 (block 1670). For example, the device may obtain a 3d volumetric image of the target as an output of the dual-domain neural network, as described above.

Although FIG. 16 shows example blocks of process 1600, in some implementations, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
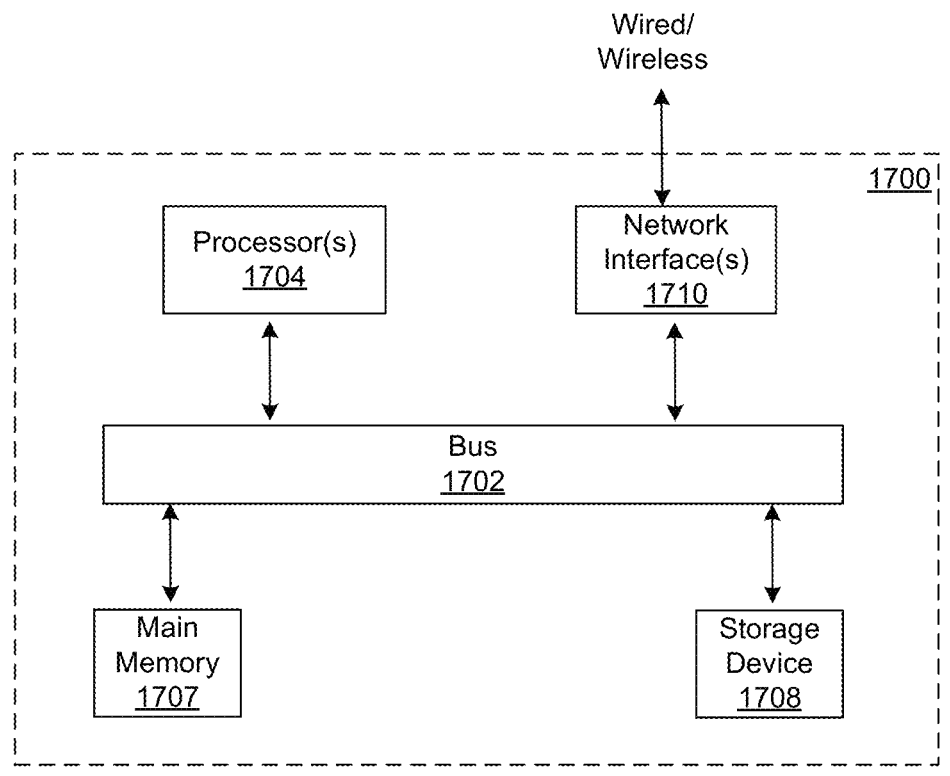
FIG. 17 illustrates an example computer system in which any of the embodiments described herein may be implemented.

FIG. 17 illustrates an example computer system in which any of the embodiments described herein may be implemented. The computing device may be used to implement one or more components of the systems and the methods shown in FIGS. 1-16. The computing device 1700 may comprise a bus 1702 or other communication mechanisms for communicating information and one or more hardware processors 1704 coupled with bus 1702 for processing information. Hardware processor(s) 1704 may be, for example, one or more general-purpose microprocessors.

The computing device 1700 may also include a main memory 1707, such as random-access memory (RAM), cache and/or other dynamic storage devices, coupled to bus 1702 for storing information and instructions to be executed by processor(s) 1704. Main memory 1707 also may be used for storing temporary variables or other intermediate information during execution of instructions to be executed by processor(s) 1704. Such instructions, when stored in storage media accessible to processor(s) 1704, may render computing device 1700 into a special-purpose machine that is customized to perform the operations specified in the instructions. Main memory 1707 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 1700 may implement the techniques described herein using customized hard-wired logic, one or more ASICs or FPGAs, firmware and/or program logic which in combination with the computing device may cause or program computing device 1700 to be a special-purpose machine. According to one embodiment, the techniques herein are performed by computing device 1700 in response to processor(s) 1704 executing one or more sequences of one or more instructions contained in main memory 1707. Such instructions may be read into main memory 1707 from another storage medium, such as storage device 1708. Execution of the sequences of instructions contained in main memory 1707 may cause processor(s) 1704 to perform the process steps described herein. For example, the processes/methods disclosed herein may be implemented by computer program instructions stored in main memory 1707. When these instructions are executed by processor(s) 1704, they may perform the steps as shown in corresponding figures and described above. In alternative embodiments, hard-wired circuit may be used in place of or in combination with software instructions.

The computing device 1700 also includes a communication interface 1710 coupled to bus 1702. Communication interface 1710 may provide a two-way data communication coupling to one or more network links that are connected to one or more networks. As another example, communication interface 1710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each process, method, and algorithm described in the preceding sections may be embodied in, and fully or partially automated by, code modules executed by one or more computer systems or computer processors comprising computer hardware. The processes and algorithms may be implemented partially or wholly in the application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions that cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), or any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted or executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method, comprising:
capturing a plurality of 2-dimensional (2D) projections of a target that cover a limited angle of the target;
performing geometric calibration and physical correction on the plurality of 2D projections of the target to obtain a plurality of physically corrected and geometrically calibrated 2D projections; and
generating a sinogram with a limited angle coverage of the target based on the plurality of physically corrected and geometrically calibrated 2D projections;
updating the sinogram by at least inserting estimated data to a missing angle region of the sinogram;
inputting the updated sinogram into a dual-domain neural network, wherein the dual-domain neural network comprises:
a first neural network trained to optimize a sinogram constructed based on limited angle fluoroscopic images, and
a second neural network trained to optimize a 3D reconstruction that is generated based on the sinogram optimized by the first neural network; and
obtaining a 3D volumetric image of the target as an output of the dual-domain neural network.

2. The computer-implemented method of claim 1, wherein the updating the sinogram by at least inserting estimated data to the missing angle region of the sinogram comprises:
generating a first 3-dimensional (3D) reconstruction of the target based on the sinogram with limited angle coverage;

24 performing a physics-based forward projection on the first 3D reconstruction to obtain the estimated data to the missing angle region; and
inserting the estimated data to the missing angle region of the sinogram to obtain the updated sinogram.

3. The computer-implemented method of claim 1, wherein the inputting the updated sinogram into the dual-domain neural network comprises:
feeding the updated sinogram into the first neural network trained to optimize the data inserted to the missing angle region of the sinogram, thereby obtaining an optimized sinogram;
generating a second 3D reconstruction based on the optimized sinogram;
feeding the second 3D reconstruction into the second neural network trained to further optimizing the second 3D reconstruction by suppressing artifacts in the second 3D reconstruction; and
obtaining the 3D volumetric image of the target as an output of the second neural network.

4. The computer-implemented method of claim 3, wherein the suppressing artifacts comprises adding, removing, or shuffling pixels of the second 3D reconstruction.

5. The computer-implemented method of claim 3, wherein the generating the second 3D reconstruction based on the optimized sinogram comprises:
if prior information of the target is available, performing iterative reconstruction to generate the second 3D reconstruction by using both the prior information of the target and the optimized sinogram,
if the prior information of the target is not available, performing Filtered Back Projection (FBP) based on the optimized sinogram to generate the second 3D reconstruction,
wherein the prior information of the target comprises a shape or a pattern of a physical object used during the capturing of the plurality of 2D projections, a prior computerized tomography (CT) scan of the target, or real-time optical tracking data from one or more optical sensors tracking the device that captures the plurality of 2D projections.

6. The computer-implemented method of claim 1, wherein the geometric calibration performed on the plurality of 2D projections of the target comprises:
spatially shifting the plurality of 2D projections based on prior information of the target to achieve a circular trajectory among the plurality of 2D projections, wherein the prior information comprises a shape or a pattern of a physical object used during the capturing of the plurality of 2D projections, a prior computerized tomography (CT) scan of the target, or real-time optical tracking data from one or more optical sensors tracking the device that captures the plurality of 2D projections.

7. The computer-implemented method of claim 1, wherein the method further comprises jointly training the first neural network and the second neural network, wherein the jointly training comprises:
obtaining training samples, each training sample comprising (1) a ground truth sinogram of a training subject constructed based on a full-angle scanning, (2) a ground truth 3D reconstruction of the training subject constructed based on the ground truth sinogram of the training subject; and (3) a preliminary sinogram constructed based on the ground truth sinogram;
inputting the preliminary sinogram to the first neural network to generate an optimized sinogram;

constructing a training 3D reconstruction based on the optimized sinogram;

inputting the training 3D reconstruction to the second neural network to generate an optimized 3D reconstruction;

backpropagating a first loss between the optimized 3D reconstruction and the ground truth 3D reconstruction for updating parameters of the second neural network;

backpropagating a second loss between the optimized sinogram and the ground truth sinogram for updating parameters of the first neural network; and iteratively performing the jointly training until both the first loss and the second loss are below respective thresholds.

8. The computer-implemented method of claim 7, wherein the obtaining the training samples comprises:

constructing the preliminary sinogram by removing a portion of data from the ground truth sinogram.

9. The computer-implemented method of claim 8, wherein the removing the portion of data comprises:

removing between 50% to 90% of data from the ground truth sinogram.

10. The computer-implemented method of claim 7, wherein the jointly training further comprises a plurality of self-augmented training stages, each self-augmented training stage comprising:

generating a new training sample during the jointly training using the preliminary sinogram and the optimized 3D reconstruction generated by the second neural network; and feeding the new training sample into the dual-domain neural network for a new round of training.

11. The computer-implemented method of claim 10, wherein the generating the new training sample comprises:

performing forward projection on the optimized 3D reconstruction and filling in missing data to the preliminary sinogram based on output of the forward projection.

12. The computer-implemented method of claim 1, further comprises:

aligning the 3D volumetric image of the target with images of a navigation system by using a plurality of optical reference points, thereby obtaining aligned 3D images of the target; and displaying the aligned 3D images of the target on a screen in real-time to provide 3D navigation for surgical procedures involving probing tools, or for verifying interventional radiology procedures.

13. The computer-implemented method of claim 1, wherein the method further comprises:

obtaining geometrical parameters of an imaging system capturing the plurality of 2D projections of the target by using one or more optical tracking sensors, and wherein the geometric calibration performed on the plurality of 2D projections of the target comprises:

spatially shifting the plurality of 2D projections based on the geometrical parameters of the imaging system to achieve a circular trajectory among the plurality of 2D projections.

14. A non-transitory computer-readable storage medium configured with instructions executable by one or more processors to cause the one or more processors to perform operations comprising:

capturing a plurality of 2-dimensional (2D) projections of a target that cover a limited angle of the target;

performing geometric calibration and physical correction on the plurality of 2D projections of the target to obtain a plurality of physically corrected and geometrically calibrated 2D projections; and generating a sinogram with a limited angle coverage of the target based on the plurality of physically corrected and geometrically calibrated 2D projections;

updating the sinogram by at least inserting estimated data to a missing angle region of the sinogram;

inputting the updated sinogram into a dual-domain neural network, wherein the dual-domain neural network comprises:

a first neural network trained to optimize a sinogram constructed based on limited angle fluoroscopic images, and a second neural network trained to optimize a 3D reconstruction that is generated based on the sinogram optimized by the first neural network; and obtaining a 3D volumetric image of the target as an output of the dual-domain neural network.

15. The non-transitory computer-readable storage medium of claim 14, wherein the updating the sinogram by at least inserting estimated data to the missing angle region of the sinogram comprises:

generating a first 3-dimensional (3D) reconstruction of the target based on the sinogram with limited angle coverage;

performing a physics-based forward projection on the first 3D reconstruction to obtain the estimated data to the missing angle region; and inserting the estimated data to the missing angle region of the sinogram to obtain the updated sinogram.

16. The non-transitory computer-readable storage medium of claim 14, wherein the inputting the updated sinogram into the dual-domain neural network comprises:

feeding the updated sinogram into the first neural network trained to optimize the data inserted to the missing angle region of the sinogram, thereby obtaining an optimized sinogram;

generating a second 3D reconstruction based on the optimized sinogram;

feeding the second 3D reconstruction into the second neural network trained to further optimizing the second 3D reconstruction by suppressing artifacts in the second 3D reconstruction; and obtaining the 3D volumetric image of the target as an output of the second neural network.

17. The non-transitory computer-readable storage medium of claim 14, wherein the operations further comprise jointly training the first neural network and the second neural network, the jointly training comprising:

obtaining training samples, each training sample comprising (1) a ground truth sinogram of a training subject constructed based on a full-angle scanning, (2) a ground truth 3D reconstruction of the training subject constructed based on the ground truth sinogram of the training subject; and (3) a preliminary sinogram constructed based on the ground truth sinogram;

inputting the preliminary sinogram to the first neural network to generate an optimized sinogram;

constructing a training 3D reconstruction based on the optimized sinogram;

inputting the training 3D reconstruction to the second neural network to generate an optimized 3D reconstruction;

backpropagating a first loss between the optimized 3D reconstruction and the ground truth 3D reconstruction for updating parameters of the second neural network;

backpropagating a second loss between the optimized sinogram and the ground truth sinogram for updating parameters of the first neural network; and iteratively performing the jointly training until both the first loss and the second loss are below respective thresholds.

18. The non-transitory computer-readable storage medium of claim 14, wherein the physical correction comprises performing real-time scatter estimation using graphic processing unit (GPU)-based real-time Monte Carlo Simulation.

19. The non-transitory computer-readable storage medium of claim 14, wherein the operations further comprise:

aligning the 3D volumetric image of the target with images of a navigation system by using a plurality of optical reference points, thereby obtaining aligned 3D images of the target; and displaying the aligned 3D images of the target through a graphic user interface (GUI) to provide real-time guidance for navigating a lead wire trajectory during a procedure, confirming a placement of a medical tool, or diagnostic assistance.

20. A system, comprising one or more processors and one or more non-transitory computer-readable memories coupled to the one or more processors and configured with instructions executable by the one or more processors to cause the system to perform operations comprising:

capturing a plurality of 2-dimensional (2D) projections of a target that cover a limited angle of the target;

performing geometric calibration and physical correction on the plurality of 2D projections of the target to obtain a plurality of physically corrected and geometrically calibrated 2D projections; and generating a sinogram with a limited angle coverage of the target based on the plurality of physically corrected and geometrically calibrated 2D projections;

updating the sinogram by at least inserting estimated data to a missing angle region of the sinogram;

inputting the updated sinogram into a dual-domain neural network, wherein the dual-domain neural network comprises:

a first neural network trained to optimize a sinogram constructed based on limited angle fluoroscopic images, and a second neural network trained to optimize a 3D reconstruction that is generated based on the sinogram optimized by the first neural network; and obtaining a 3D volumetric image of the target as an output of the dual-domain neural network.

* * * * *